(12) United States Patent
Han et al.

(10) Patent No.: US 8,352,232 B2
(45) Date of Patent: Jan. 8, 2013

(54) MODELING ELECTRICAL INTERCONNECTIONS IN THREE-DIMENSIONAL STRUCTURES

(75) Inventors: Ki Jin Han, Atlanta, GA (US); Madhavan Swaminathan, Marietta, GA (US)

(73) Assignee: Georgia Tech Research Corporation, Atlanta, GA (US)

(*) Notice: Subject to any disclaimer, the term of this patent is extended or adjusted under 35 U.S.C. 154(b) by 961 days.

(21) Appl. No.: 12/288,616

(22) Filed: Oct. 22, 2008

(65) Prior Publication Data

US 2010/0094609 A1  Apr. 15, 2010

Related U.S. Application Data

(60) Provisional application No. 60/982,505, filed on Oct. 25, 2007.

(51) Int. Cl.
G06F 17/50  (2006.01)
G06F 9/455  (2006.01)

(52) U.S. Cl. ............. 703/14; 703/13; 716/100; 716/106

(58) Field of Classification Search ............. 703/13, 703/14; 716/100, 106
See application file for complete search history.

(56) References Cited

U.S. PATENT DOCUMENTS

| | | | |
|---|---|---|---|
| 6,188,582 B1 | 2/2001 | Peter | |
| 7,088,782 B2* | 8/2006 | Mody et al. | 375/260 |
| 7,231,618 B2* | 6/2007 | Huang et al. | 716/115 |
| 7,289,945 B2* | 10/2007 | Jiao et al. | 703/14 |
| RE41,001 E | 11/2009 | Oshima | |
| 7,895,540 B2* | 2/2011 | Engin et al. | 716/106 |
| 2008/0091389 A1 | 4/2008 | Kim | |

OTHER PUBLICATIONS

"Cylindrical Conduction Mode Basis Functions for Modeling of Inductive Couplings in System-in-Package (SiP)" Han, et al. 2007 IEEE.*
"Electric Field Integral Equation Combined with Cylindrical Conduction Mode Basis Functions for Electrical Modeling of Three-dimensional Interconnects", Han et al. Jun. 8-13, 2008.*
Lee et al.; "Analysis of power delivery network constructed by irregular-shaped power/ground plane including densely populated via-hole"; Publication Year: 2005; Advanced Packaging, IEEE Transactions on; vol. 28, Issue: 2; pp. 168-173.

(Continued)

Primary Examiner — Omar Fernandez Rivas
Assistant Examiner — Nithya Janakiraman
(74) Attorney, Agent, or Firm — Bryan W. Bockhop; Bockhop & Associates, LLC

(57) ABSTRACT

Disclosed are apparatus, methods and software that implement a partial element equivalent circuit (PEEC) method having global basis functions on cylindrical coordinates to determine wide-band resistance, inductance, capacitance, and conductance from a large number of three-dimensional interconnections in order to provide for the electrical design of system-in-package (SIP) modules, and the like. The apparatus, methods and software use a modal equivalent network from mixed potential integral equation with cylindrical conduction and accumulation mode basis functions, which reduces the matrix size for large three-dimensional interconnection problems. Combined with these modal basis functions, the mixed potential integral equations describe arbitrary skin and proximity effects, and allow determination of partial impedance and admittance values. Additional enhancement schemes further reduces the cost for computing the partial inductances. Therefore, the apparatus, methods and software can be used to construct accurate models of a large number of three-dimensional interconnection structures, including more than 100 bonding wires used for stacking integrated circuit chips, through-silicon via interconnections, and the like.

18 Claims, 15 Drawing Sheets

OTHER PUBLICATIONS

Wu et al.; "Composite effects of reflections and ground bounce for signal line through a split power plane"; Publication Year: 2002; Advanced Packaging, IEEE Transactions on; vol. 25, Issue: 2; pp. 297-301.

Bharath et al.; "Efficient Simulation of Power/Ground Planes for SiP Applications"; Publication Year: 2007; Electronic Components and Technology Conference, 2007. ECTC '07. Proceedings. 57th; pp. 1199-1205.

Engin et al.; "Finite-difference modeling of noise coupling between power/ground planes in multilayered packages and boards"; Publication Year: 2006; Electronic Components and Technology Conference, 2006. Proceedings. 56th.

Pan et al.; "A combined finite difference and analytic expression approach to crossover capacitance in a multilayer dielectric environment"; Publication Year: 1996; Components, Packaging, and Manufacturing Technology, Part B: Advanced Packaging, IEEE Transactions on; vol. 19, Issue: 3; , pp. 615-620.

Bharath et al.; "Computationally Efficient Power Integrity Simulation for System-on-Package Applications"; Publication Year: 2007; Design Automation Conference, 2007. DAC '07. 44th ACM/IEEE; , pp. 612-617.

Bushyager et al.; "Q-factor prediction and optimization of multilayer inductors for RF packaging microsystems using time domain techniques"; Publication Year: 2002; Electronic Components and Technology Conference, 2002. Proceedings. 52nd; pp. 1718-1721.

Horii et al.; "Super-compact multilayered left-handed transmission line and diplexer application"; Publication Year: 2005; Microwave Theory and Techniques, IEEE Transactions on; vol. 53, Issue: 4, Part: 2; pp. 1527-1534.

U.S. Appl. No. 11/888,705, filed Aug. 2, 2007 by Engin et al.

U.S. Appl. No. 12/710,991, filed Feb. 23, 2010 by Bahrath et al.

R. R. Tummala, "SOP: What Is It and Why? A New Microsystem-Integration Technology Paradigm-Moore's Law for System Integration of Miniaturized Convergent Systems of the Next Decade," IEEE Trans. Advanced Packaging, vol. 27, pp. 241, 2004.

E. Awad, et al., "Stacked-Chip Packaging: Electrical, Mechanical, and Thermal Challenges," in Proc. IEEE 54th Electronic Components and Technology Conference, vol. 2, pp. 1608-1613, Jun. 2004.

M. Dreiza, et al., "Stacked Package-on-Package Design Guide," Chip Scale Review, Jun. 6, 2006.

C. T. Tsai, "Package Inductance Characterization at High Frequencies," IEEE Trans. Components, Packaging and Manufacturing Technology Part B: Advanced Packaging, vol. 17, pp. 175-181, May 1994.

H. Patterson, "Analysis of Ground Bond Wire Arrays for RFICs," in IEEE Radio Frequency Integrated Circuits (RFIC) Symposium Digest, pp. 237-240, Jun. 1997.

E. Milke, et al., "New Bonding Wire for Fine Pitch Applications," in Proc. IEEE Electronics Packaging Technology Conference, pp. 750-754, 2007.

F. Alimenti, et al., "Modeling and Characterization of the Bonding-Wire Interconnection," IEEE Trans. Microwave Theory and Techniques, vol. 49, pp. 142-150, Jan. 2001.

C. Schuster, et al., "Electromagnetic Simulation of Bonding Wires and Comparison with Wide Band Measurements," IEEE Trans. Advanced Packaging, vol. 23, pp. 69-79, Feb. 2000.

I. Doerr, et al., "Parameterized Models for a RF Chip-to-Substrate Interconnect," in Proc. IEEE 51st Electronic Components and Technology Conference, pp. 831-838, May-Jun. 2001.

J. Y. Chuang, et al., "Radio Frequency Characterization of Bonding Wire Interconnections in a Modeled Chip," in Proc. IEEE 54th Electronic Components and Technology Conference, 2004.

M. Kamon, et al., "FASTHENRY: A Multipole-Accelerated 3-D Inductance Extraction Program," IEEE Trans. Microwave Theory and Techniques, vol. 42, pp. 1750-1758, Sep. 1994.

L. Daniel et al., "Interconnect Electromagnetic Modeling using Conduction Modes as Global Basis Functions," Topical Meeting on Electrical Performance of Electronic Packages, EPEP 2000, Scottsdale, Arizona, Oct. 2000.

A. E. Ruehli, "Equivalent Circuit Models for Three-Dimensional Multiconductor Systems," IEEE Trans. Microwave Theory and Techniques, vol. 22, pp. 216-221, Mar. 1974.

L. Daniel, et al., "Using Conduction Mode Basis Functions for Efficient Electromagnetic Analysis of On-Chip and Off-Chip Interconnect," in Proc. ACM/IEEE 38th Design Automation Conference, pp. 563-566, Jun. 2001.

L. Daniel, et al., "Proximity Templates for Modeling of Skin and Proximity Effects on Packages and High Frequency Interconnect," in Proc. IEEE/ACM International Conference on Computer Aided Design, pp. 326-333, Nov. 2003.

A. E. Ruehli and A. C. Cangellaris, "Progress in the Methodologies for the Electrical Modeling of Interconnects and Electronic Packages," Proceedings of the IEEE, vol. 89, pp. 740-771, May 2001.

S. Ray, et al., "Closed Form Expression for Mutual Partial Inductance between Two Skewed Linear Current Segments," in Proc. Antennas and Propagation Society International Symposium, pp. 1278-1281, Jul. 1999.

J.B. Faria and M.G. das Neves, "Accurate Evaluation of Indoor Triplex Cable Capacitances Taking Conductor Proximity Effects into Account," IEEE Trans. Power Delivery, vol. 21, pp. 1238-1244, Jul. 2006.

K. J. Han et al., "Wideband Electrical Modeling of Large Three-Dimensional Interconnects using Accelerated Generation of Partial Impedances with Cylindrical Conduction Mode Basis Functions," in Proc. IEEE MTT-S International Microwave Symposium, pp. 1297-1300, Jun. 15-20, 2008.

G. Antonini and A. E. Ruehli, "Fast Multipole and Multifunction PEEC Methods," IEEE Trans. Mobile Computing, vol. 2, pp. 288-298, Oct.-Dec. 2003.

Y. Fukui, et al., "Triple-Chip Stacked CSP," in Proc. IEEE Electronic Components and Technology Conference, pp. 385-389, May 2000.

Kim, Joong-Ho, "Modeling of Multilayered Power Distribution Planes Using Transmission Matrix Method" IEEE Transactions on Advanced Packaging, vol. 25, No. 2, May 2002.

* cited by examiner

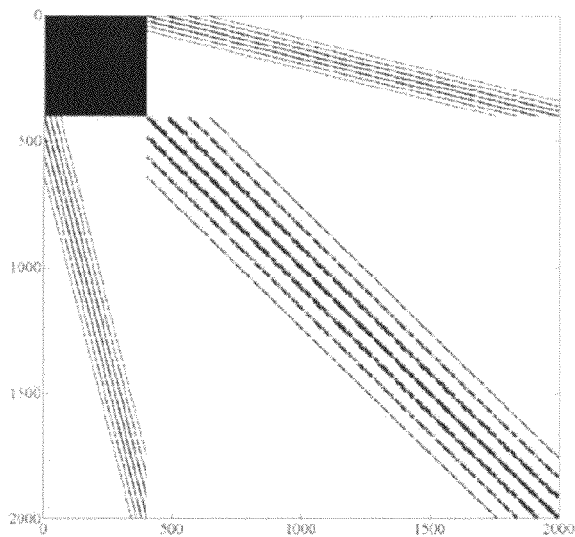
Fig. 15
Fig. 16a
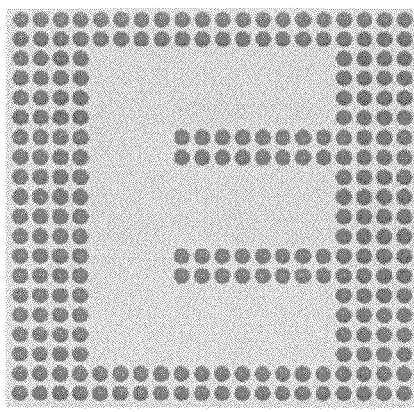
Fig. 16b
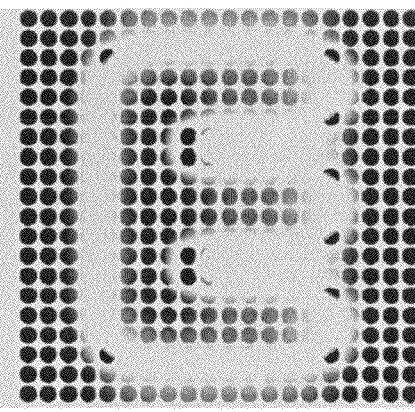
Fig. 16c
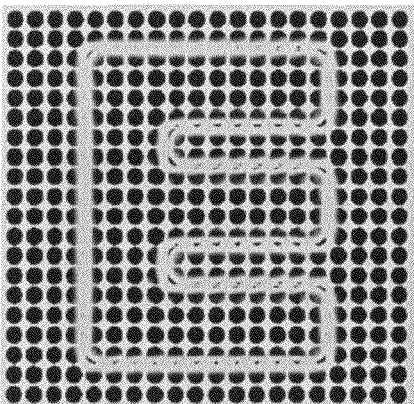
Fig. 16d
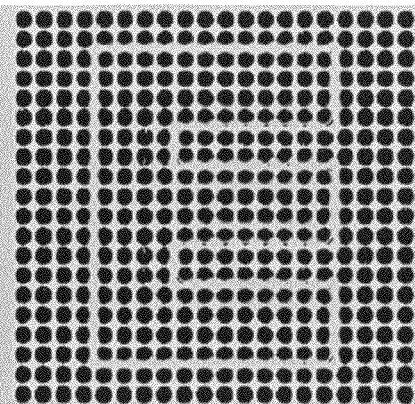

MODELING ELECTRICAL INTERCONNECTIONS IN THREE-DIMENSIONAL STRUCTURES

This application claims the benefit of U.S. Provisional Application No. 60/982,505, filed Oct. 25, 2007.

BACKGROUND

The present invention relates generally to electrical interconnection modeling apparatus, methods, software and techniques, and more particularly to electrical modeling apparatus, methods software and techniques employing cylindrical conduction mode basis functions for modeling system-in-package (SiP) modules, including coupling, wire bonds and three-dimensional interconnects, and the like.

A popular choice for realizing miniaturized multimedia system in today's microelectronics is integrating various submodules in a single package. Compared to traditional multichip modules (MCM), modern package-based system achieves a higher density of integration by employing stacked integrated circuits (IC) technology, which is known as three-dimensional integration or system-in-package modules. With the additional benefits of simple design and efficient IC processing, such as those discussed by R. R. Tummala, "SOP: What Is It and Why? A New Microsystem—Integration Technology Paradigm—Moore's Law for System Integration of Miniaturized Convergent Systems of the Next Decade," *IEEE Trans. Advanced Packaging*, vol. 27, pp. 241-249, May 2004, system-in-package modules are gaining popularity among package manufacturers since it offers better electrical performance through shorter interconnect lengths at lower cost.

However, the commercialization of system-in-package modules is facing difficulty in achieving the desired electrical performance, which is due to the unexpected coupling and loss from complicated three-dimensional interconnections such as bonding wires (FIG. 1) and through-silicon via (TSV) interconnections, such as is discussed by E. Awad, et al., "Stacked-Chip Packaging: Electrical, Mechanical, and Thermal Challenges," in *Proc. IEEE 54th Electronic Components and Technology Conference*, vol. 2, pp. 1608-1613, June 2004. FIG. 1 shows exemplary three-dimensional bonding wire integration. Thus, efficient electrical modeling of three-dimensional interconnections is becoming a critical issue in system-in-package interconnection design.

A major difficulty in modeling three-dimensional interconnections involves the need to obtain the entire coupling model of a large number of three-dimensional interconnections. In a typical system-in-package module that includes several stacked ICs, the number of bonding wires or through-silicon via interconnections are close to a thousand, as discussed by M. Dreiza, et al., "Stacked Package-on-Package Design Guide," *Chip Scale Review*, July 2005, causing coupling between interconnections due to criss-crossing of the wires. The bond wires are also distributed a vertically and in parallel. Furthermore, the coupling model should include frequency-dependent losses caused by skin and proximity effects, which are especially significant in high frequency applications that require matched interconnection impedance. Therefore, for accurate electrical design of system-in-package modules covering wide frequency range for radio frequency (RF), analog, and digital applications, a frequency-dependent coupling model of several interconnections is required.

Current modeling methods have limits in their applicability to characterize large three-dimensional interconnections. For example, measurement based methods are complicated due to the complexity of probing the three-dimensional structures, such as is discussed by C. T. Tsai, "Package Inductance Characterization at High Frequencies," *IEEE Trans. Components, Packaging and Manufacturing Technology Part B: Advanced Packaging*, vol. 17, pp. 175-181, May 1994.

Other available modeling approaches utilize analytical expressions of either partial inductances. Such as are discussed by H. Patterson, "Analysis of Ground Bond Wire Arrays For RFICs," in *IEEE Radio Frequency Integrated Circuits (RFIC) Symposium Digest*, pp. 237-240, June 1997, and F. W. Grover, *Inductance Calculations—Working Formulas and Tables*. Mineola, N.Y.: Dover Publications, 1946, or segmented transmission lines discussed by F. Alimenti, et al., "Modeling and Characterization of the Bonding-Wire Interconnection," *IEEE Trans. Microwave Theory and Techniques*, vol. 49, pp. 142-150, January 2001 to extract coupling model with low computational cost, but these simplified approaches do not capture high-frequency losses.

Accurate high-frequency models are provided by numerical methods such as full-wave electromagnetic methods discussed by C. Schuster, et al., "Electromagnetic Simulation of Bonding Wires and Comparison with Wide Band Measurements," *IEEE Trans. Advanced Packaging*, vol. 23, pp. 69-79, February 2000, I. Doerr, et al., "Parameterized Models for a RF Chip-to-Substrate Interconnect," in *Proc. IEEE 51st Electronic Components and Technology Conference*, pp. 831-838, May-June 2001, and J. Y. Chuang, et al., "Radio Frequency Characterization of Bonding Wire Interconnections in a Modeled Chip," in *Proc. IEEE 54th Electronic Components and Technology Conference*, vol. 1, pp. 392-399, June 2004, or quasi-static parasitic extractor such as FastHenry, discussed by M. Kamon, et al., "FASTHENRY: A Multi pole-Accelerated 3-D Inductance Extraction Program," *IEEE Trans. Microwave Theory and Techniques*, vol. 42, pp. 1750-1758, September 1994. However, the use of these approaches is limited to solving mostly one or two interconnections because of their increased cost for solving large size problems.

To model three-dimensional structures, existing simulation methods, such as the well-known partial element equivalent circuit (PEEC) method, require large amount of memory and has a long simulation time. A method developed by L. Daniel et al. is a partial element equivalent circuit method using conduction mode basis functions (CMBF). This is discussed in "Interconnect Electromagnetic Modeling using Conduction Modes as Global Basis Functions," Topical Meeting on Electrical Performance of Electronic Packages, EPEP 2000, Scottsdale, Ariz., October 2000.

Since a conduction mode basis function is a global function over a conductor cross-section, no discretization process is needed. With a small number of Cartesian coordinate conduction mode basis functions, the Daniel et al. procedure describes high-frequency effects with the same accuracy as the classical partial element equivalent circuit method. Simplified equivalent circuits are another benefit of the Daniel et al. approach. However, conduction mode basis functions constructed on Cartesian coordinates are not geometrically suitable for modeling bond wire structures.

The trend of current electronic packaging is to integrate multiple functions in a three-dimensional structure, such as a system-in-package (SiP) module. Since the density of the three-dimensional integration is higher, electrical modeling of interconnects becomes more difficult. The number of bond wires or through-silicon via interconnections in typical three-dimensional integration is over one thousand, which also results in stronger electrical coupling between neighboring interconnects. With the need for a wide-band model to realize various functions in system-in-package modules, constructing a full coupling model of a large number of interconnects for a wide band is a main design requirement for advanced packaging designs.

For the purpose of finding a large coupling model in three-dimensional integrations, modeling methods should manage the issue of accuracy, speed, and memory more deliberately. The Daniel et al. modeling method uses global basis functions on a conductor cross section to solve the electric field integral equation (EFIE). A few global conduction mode basis functions capture skin and proximity effects, so the Daniel et al. CMBF-based method reduces the size of the partial impedance matrix considerably compared to the classical partial element equivalent circuit (PEEC) method developed by A. E. Ruehli. However, the Daniel et al. CMBF-based method, which was for the modeling of micro-strip type interconnects on a printed circuit board (PCB), is not geometrically suitable for the modeling of wire bonds or other three-dimensional structures with circular cross sections. A more important issue in using conduction mode basis functions on Cartesian coordinates is the required additional procedure of constructing basis functions to describe arbitrary current crowding.

There is therefore a need for improved apparatus, methods, software and techniques for modeling electrical interconnection structures, and the like. It would be desirable to have electrical modeling apparatus, methods, software and techniques employing cylindrical modal basis functions for modeling of system-in-package (SiP) modules, including coupling, wire bonds and three-dimensional interconnects, and the like.

BRIEF DESCRIPTION OF THE DRAWINGS

The features and advantages of the present invention may be more readily understood with reference to the following detailed description taken in conjunction with the accompanying drawings, wherein like reference numerals designate like structural elements, and in which:

FIGS. 5a and 5b show equivalent circuit examples, where two proximity-effect mode (PE-mode) basis functions are included for each conductor, and wherein FIG. 5a shows an equivalent circuit comprising two coupled cylinders and FIG. 5b shows an equivalent circuit comprising two bonding wires;

FIGS. 14a-14c are graphs that illustrate a scalability analysis of the method with a through-hole via array model, wherein the number of frequency points is 30, and the left graph shows a pitch of 30 μm, and the right graph shows a pitch 50 μm, and wherein FIG. 14a shows the number of non-zero elements, FIG. 14b shows total absolute simulation time, and FIG. 14c shows total relative simulation time;

FIG. 15 shows a sparsity pattern of a system matrix of the 20-by-20 through-hole via problem after applying efficiency enhancements;

FIG. 16a-16d illustrate current density distribution at different frequencies in a 20-by-20 through-hole via array;

DETAILED DESCRIPTION

Figure 1:
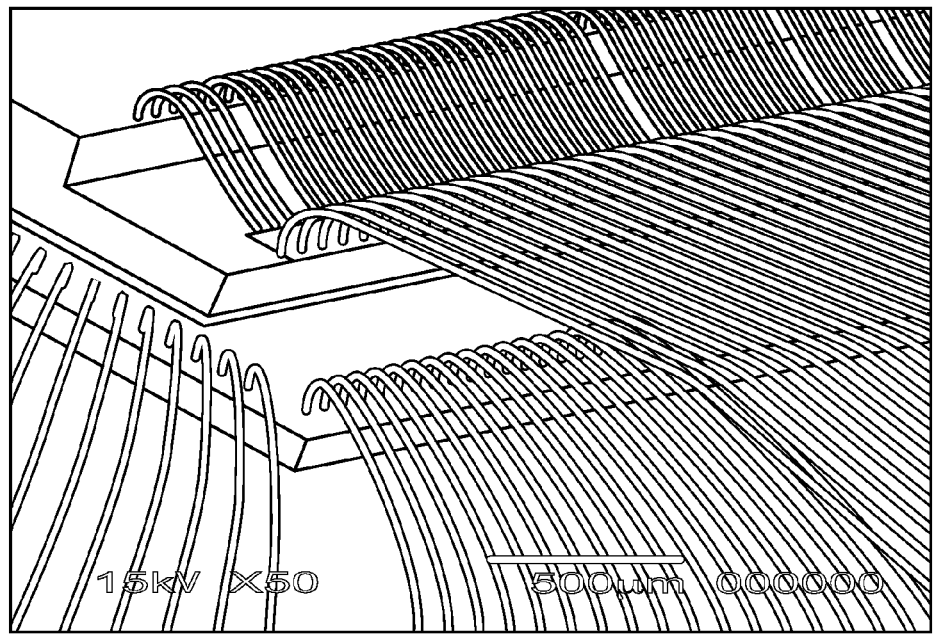
FIG. 1 illustrates exemplary three-dimensional bonding wire integration.

In order to address issues relating to modeling interconnections in large three-dimensional structures, disclosed are efficient modeling techniques, which may be implemented in the form of apparatus, methods or software, that extract equivalent network from the formulation of the mixed potential integral equation (MPIE). The techniques are based on the same framework as the partial element equivalent circuit (PEEC) method generally discussed by A. E. Ruehli, "Equivalent Circuit Models for Three-Dimensional Multi-conductor Systems," *IEEE Trans. Microwave Theory and Techniques*, vol. 22, pp. 216-221, March 1974, but it is different in the use of a global conduction mode basis function. L. Daniel, et al. used the conduction mode basis function to improve efficiency for modeling planar interconnections. However, it is not suitable for cylindrical geometries, which are necessary for modeling cylindrical conductors used in three-dimensional integration. Therefore, a cylindrical modal basis function is employed in the present techniques.

The cylindrical modal basis function with its classification is discussed below, including formulation of the electric field integral equation combined with the basis functions. The formulation procedure also includes the computation of partial impedances and admittances and the construction of equivalent circuits. Implementation of the apparatus, methods and software with two schemes to achieve the capability required for a large number of three-dimensional interconnections. Several application examples are discussed that validate the accuracy and efficiency of the apparatus, methods and software.

Formulation of a Mixed Potential Integral Equation with Cylindrical Modal Basis Functions Discussed below are modal basis functions and their classification. The cylindrical modal basis functions enable description of current and charge density distribution. These basis functions are used to construct a equivalent circuit equation. Several techniques for computing partial resistances, inductances, conductances, and capacitances are also discussed.

Cylindrical Conduction Mode Basis Functions (for Capturing Current Density Distribution and Resistance-Inductance (R-L) Extraction)

The main feature of the conduction mode basis function is that it globally describes the current density distribution in a cross section of a conductor. Using this global nature of the conduction mode basis function reduces the required number of basis functions, which can be large when using localized constant basis functions as discussed in the A. E. Ruehli paper. A smaller number of bases has a merit for reducing the size of partial impedance matrix, as is discussed regarding the use of the conduction mode basis function for rectangular geometries by L. Daniel, et al., "Using Conduction Mode Basis Functions for Efficient Electromagnetic Analysis of On-Chip and Off-Chip Interconnect," in *Proc. ACM/IEEE 38th Design Automation Conference*, pp. 563-566, June 2001.

The cylindrical conduction mode basis functions are constructed from the following current density diffusion equation.

$$\nabla \times \nabla \times \vec{J} + \alpha^2 \vec{J} = 0 \tag{1}$$

where $\vec{J}$ is current density (A/m$^2$), $$\alpha^2 = -j\omega\mu\sigma = -\left(\frac{1+j}{\delta}\right)^2, $$

$\omega = 2\pi f$ if is angular frequency (rad/sec), $\mu = 4\pi \times 10^{-7}$ is the free-space permeability (H/m), $\sigma$ is conductivity (S/m), and $\delta = 1/\sqrt{\pi f \mu \sigma}$ is skin depth (m). One assumption of deriving equation (1) from Maxwell's equation is that the medium is a good conductor ($\sigma \gg \omega \epsilon$). The other assumption about the current density is that it flows in an axial direction without any longitudinal variation. These assumptions are valid for thin conductors used in practice. By inserting $\vec{J} = J_z(\rho,\phi)\hat{z}$, equation (1) may be simplified to the following equation in cylindrical coordinates.

$$\frac{1}{\rho}\frac{\partial}{\partial \rho}\left[\rho \frac{\partial J_z}{\partial \rho}\right] + \frac{1}{\rho^2}\frac{\partial^2 J_z}{\partial \varphi^2} + \alpha^2 J_z = 0. \tag{2}$$

By using the separation of variables, i.e. $J_z(\rho,\phi) = R(\rho)\Phi(\phi)$, equation (2) may be separated into the following two ordinary differential equations:

$$\rho^2 R''(\rho) + \rho R'(\rho) + (\alpha^2 \rho^2 - \nu^2) R(\rho) = 0. \tag{3}$$

$$\Phi''(\phi) + \nu^2 \Phi(\phi) = 0. \tag{4}$$

Since the current density distribution should be continuous over the conductor cross section, the solutions of equation (4) are periodic (harmonic) functions, and $\nu$ should be an integer n. Substituting $\nu^2$ by $n^2$ converts equation (3) into a Bessel differential equation of the order n. Therefore, the basis functions, which are the solutions of the diffusion equation, have the following form.

$$\cos(n(\phi - \phi_0)) J_n(\alpha \rho) \ n = 0, 1, 2, \ldots, \tag{5}$$

where $J_n(\alpha \rho)$ is the n$^{th}$ order Bessel function or Kelvin function, the asymptotic behavior of which is the exponential function of $\rho$. For the use of equation (5) as basis functions, a proper classification of the order n and the orientation $\phi_0$ is necessary.

Physical behaviors of the bases with different orders classify the cylindrical conduction mode basis functions into skin-effect (SE) and proximity-effect (PE) modes. The skin-effect-mode basis is the fundamental order (n=0) function, which shows the same behavior as that of the skin effect current distribution in a circular cross section. The proximity-effect modes are the remaining higher order (n>0) basis functions, which have sinusoidal behaviors in their angular variations. The collection of the harmonic angular functions in proximity-effect modes enables the description of current crowding caused by proximity effects. Considering that a Fourier series expansion can express any periodic function of $\phi$, two orthogonal basis functions are classified for each order of the proximity-effect modes. Thus, the cylindrical conduction mode basis functions are classified into the following groups for the i$^{th}$ conductor in the global coordinates.

Skin-effect (SE) mode (n=0):

$$\vec{w}_{i0} = \begin{cases} \frac{\hat{z}_i}{A_{i0}} J_0(\alpha(\vec{r} - \vec{r}_i) \cdot \hat{\rho}_i) & \vec{r} \in V_i \\ 0 & \text{elsewhere,} \end{cases} \tag{6}$$

Proximity-effect, direct (PE-d) mode (n>0):

$$\vec{w}_{ind} = \begin{cases} \frac{\hat{z}_i}{A_{in}} J_n(\alpha(\vec{r} - \vec{r}_i) \cdot \hat{\rho}_i) \cos(n\varphi_i) & \vec{r} \in V_i \\ 0 & \text{elsewhere,} \end{cases} \tag{7}$$

Proximity-effect, quadrature (PE-q) mode (n>0):

$$\vec{w}_{inq} = \begin{cases} \frac{\hat{z}_i}{A_{in}} J_n(\alpha(\vec{r} - \vec{r}_i) \cdot \hat{\rho}_i) \sin(n\varphi_i) & \vec{r} \in V_i \\ 0 & \text{elsewhere,} \end{cases} \tag{8}$$

where $\vec{r} = x\hat{x} + y\hat{y} + z\hat{z}$ is a point in the i$^{th}$ conductor, $\vec{r}_i = x_{i0}\hat{x} + y_{i0}\hat{y} + z_{i0}\hat{z}$ is the center point of the i$^{th}$ conductor, and $A_{in}$ is the effective area. $A_{in}$ is a constant that normalizes the basis function so that the integration of the function over the cross section equals unity. If n=0, the effective area can be found as follows.

$$A_{i0} = \frac{2\pi \rho_i}{\alpha} J_1(\alpha \rho_i). \tag{9}$$

However, the integrations of the higher-order basis functions (n≧1) should be zero due to the harmonic component in the $\phi$ direction. Thus, the normalization is re-defined as follows.

$$\int_{S_{in}} \vec{w}_{in} \cdot d\vec{S} = \frac{1}{2n}, \tag{10}$$

where $S_{in}$ is a part of the cross section occupied by a half period of the harmonic function. By inserting (7) or (8), $$A_{in} = \frac{2^{2-n} \alpha^n \rho_i^{2+n}}{(2+n)n!} {}_1F_2\left(1 + \frac{n}{2}; \left\{2 + \frac{n}{2}, 1 + n\right\}; -\frac{1}{4}\alpha^2 \rho_i^2\right), \tag{11}$$

where ${}_1F_2$ is one of the forms of the generalized hypergeometric functions.

Figure 2:
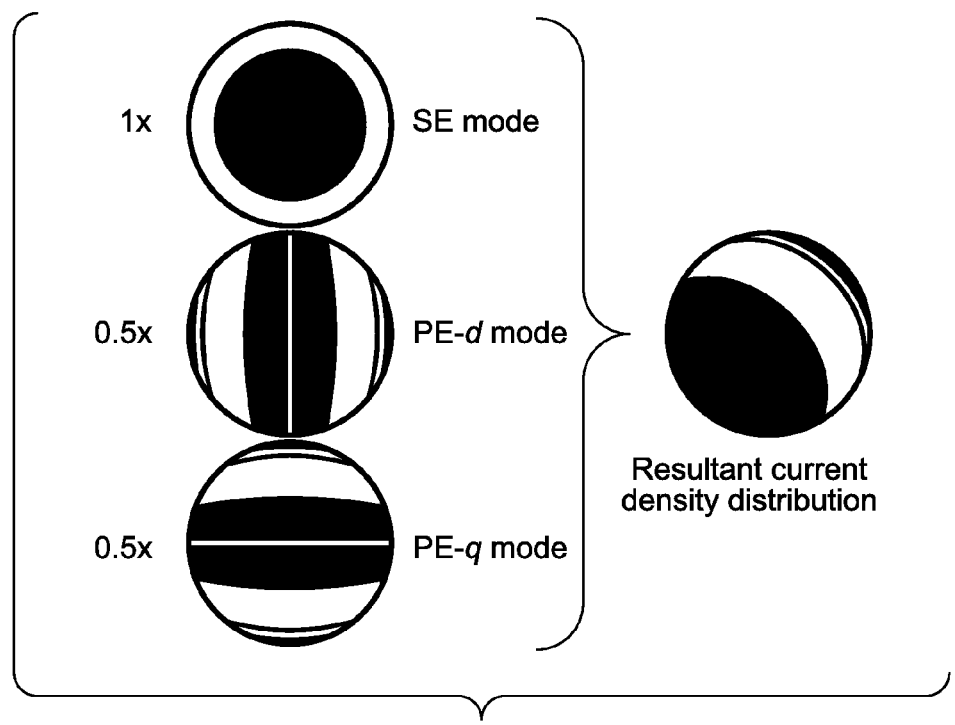
FIG. 2 illustrates examples of cylindrical conduction mode basis functions at $10^8$ Hz and their combination to generate a current density distribution

A main advantage of using the cylindrical conduction mode basis function is that the orthogonal proximity-effect-mode bases automatically capture current crowding in any orientation. This feature makes the techniques free from pre-constructing the shapes of the basis functions based on conductor geometry or the generation of proximity templates, as discussed by L. Daniel, et al., "Proximity Templates for Modeling of Skin and Proximity Effects on Packages and High Frequency Interconnect," in *Proc. IEEE/ACM International Conference on Computer Aided Design*, pp. 326-333, November 2003. Thus, the cylindrical conduction mode basis function may be applied for more general 3D interconnection problems, where many conductor segments are located complicatedly. For example, FIG. 2 illustrates how the linear combination of skin-effect- and proximity-effect-mode basis functions describes a specified current density distribution induced by the vicinity of nearby conductors.

Cylindrical Accumulation Mode Basis Functions (for Capturing Charge Density Distribution and Conductance-Capacitance (G-C) Extraction)

The cylindrical accumulation mode basis function captures the charge density distribution on the surface of cylindrical conductors, which are governed by the following Laplace's equation, $$\nabla^2 V = 0. \tag{12}$$

Using a similar procedure, in the case of cylindrical conduction mode basis functions, the fundamental and higher-order accumulation mode bases are obtained as follows.

Skin-effect (SE) mode (n=0):

$$v_{i0} = \begin{cases} \dfrac{1}{S_{i0}} & \vec{r} \in S_i \\ 0 & \text{elsewhere,} \end{cases} \tag{13}$$

Proximity-effect, direct (PE-d) mode (n>0):

$$v_{ind} = \begin{cases} \dfrac{1}{S_{in}} \cos(n\varphi_i) & \vec{r} \in S_i \\ 0 & \text{elsewhere,} \end{cases} \tag{14}$$

Proximity-effect, quadrature (PE-q) mode (n>0):

$$v_{inq} = \begin{cases} \dfrac{1}{S_{in}} \sin(n\varphi_i) & \vec{r} \in S_i \\ 0 & \text{elsewhere,} \end{cases} \tag{15}$$

The cylindrical accumulation mode basis functions have the same harmonic variations as the cylindrical conduction mode basis function. On the other hand, the accumulation mode bases are different from the conduction mode bases in that they are scalar functions defined on the conductor surfaces. In addition, cost of computing integrals including the accumulation mode bases is much lower than the cost related to the conduction mode bases since the accumulation mode is frequency independent.

Formulation of the Partial Element Equivalent Circuit

The previously defined cylindrical conduction and accumulation mode basis functions are inserted into the mixed potential integral equation and forms equivalent voltage equations, which include modal partial impedances (series resistances and inductances) and admittances (parallel capacitors and conductances) of each conductor. The formulation procedure is discussed below, including calculation of impedances and admittances and construction of an equivalent network.

1) Voltage equation: As in the classical PEEC method discussed by A. E. Ruehli and the original CMBF-based method discussed by L. Daniel, et al., the disclosed techniques approximate the following mixed potential integral equation.

$$\frac{\vec{J}(\vec{r},\omega)}{\sigma} + j\omega \frac{\mu}{4\pi} \int_{V'} G(\vec{r},\vec{r}') \vec{J}(\vec{r}',\omega) dV' = -\nabla \Phi(\vec{r},\omega) \tag{16}$$

$$\frac{1}{4\pi\varepsilon_0} \int_{V'} G(\vec{r},\vec{r}') \rho(\vec{r}',\omega) dV' = \Phi(\vec{r},\omega),$$

where $\Phi(\vec{r},\omega)$ is electric potential (V) and $G(\vec{r},\vec{r}') = e^{-jk_0|\vec{r}-\vec{r}'|}/|\vec{r}-\vec{r}'|$ is Green's function. An assumption in this paper is that the maximum size of the problem space is much smaller than the wavelength of the maximum modeling frequency, so retardation term ($e^{-jk_0|\vec{r}-\vec{r}'|}$) is negligible as in the ($L_p$, R) PEEC method discussed by A. E. Ruehli and A. C. Cangellaris, "Progress in the Methodologies for the Electrical Modeling of Interconnects and Electronic Packages," *Proceedings of The IEEE*, vol. 89, pp. 740-771, May 2001.

Figure 3:
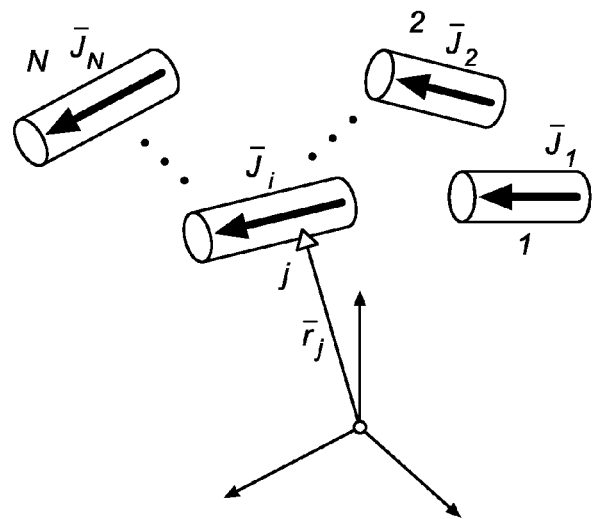
FIG. 3 illustrates an N-cylindrical conductor system.

FIG. 3 defines a general N-conductor system to be discussed in this section. As discussed in the previous section, a major difference of the CMBF-based method from the classical PEEC method is that the integral equation is not discretized to volume filaments but to globally-defined conduction modes. However, each cylindrical conduction mode basis function is actually localized to each conductor, as shown in equations (6) to (8). Therefore, for the approximation of current density on a conductor segment j, basis functions that belong to the conductor are combined as follows.

$$\vec{J}_j(\vec{r},\omega) \cong \sum_{n,q} I_{jnq} \vec{w}_{jnq}(\vec{r},\omega). \tag{17}$$

Similarly, the approximate charge density distribution is the linear combination of the accumulation mode basis functions.

$$\rho_{j'}(\vec{r}) \cong \sum_{n',q'} Q_{j'n'q'} v_{j'n'q'}(\vec{r}). \tag{18}$$

By inserting the approximations equations (17-18) into the current and charge density terms in equation (16) and applying the following inner product based on Galerkin's method, $$\langle \vec{w}_{imd}(\vec{r},\omega), \vec{x} \rangle = \int_V \vec{w}_{imd}^*(\vec{r},\omega) \cdot \vec{x} \, dV$$

$$\langle v_{i'm'd'}(\vec{r},\omega), x \rangle = \int_S v_{i'm'd'}(\vec{r},\omega) x \, dS, \tag{19}$$

the voltage equation is obtained containing the following partial resistance, partial inductance, partial coefficient of potential, and modal voltage difference.

$$\sum_{n,q} I_{jnq} Rp_{imd,jnq} + j\omega \sum_{n,q} I_{jnq} Lp_{imd,jnq} = \Delta V_{imd}^j \tag{20}$$

-continued $$\sum_{n',q'} Q_{j'n'q'} Pp_{i'm'd',j'n'q'} = V_{i'm'd'}^{j'},$$

where $$Rp_{imd,jnq} = \frac{1}{\sigma} \int_{V_i} \vec{w}_{imd}^*(\vec{r}_i, \omega) \cdot \vec{w}_{jnq}(\vec{r}_i, \omega) dV_i,$$

$$Lp_{imd,jnq} = \frac{\mu}{4\pi} \int_{V_i} \int_{V_j} \vec{w}_{imd}^*(\vec{r}_i, \omega) \cdot \vec{w}_{jnq}(\vec{r}_i, \omega) \frac{1}{|\vec{r}_i - \vec{r}_j|} dV_j dV_i,$$

$$Pp_{i'm'd',j'n'q'} = \frac{1}{4\pi\varepsilon} \int_{S_i} \int_{S_j} v_{i'm'd'}^*(\vec{r}_{i'}, \omega) v_{j'n'q'}(\vec{r}_{j'}, \omega)$$

$$\frac{1}{|\vec{r}_i - \vec{r}_j|} dS_{j'} dS_{i'},$$

$$\Delta V_{imd}^j = -\int_{S_i} \Phi(\vec{r}_i) \vec{w}_{imd}^*(\vec{r}_i, \omega) \cdot d\vec{A}_i,$$

and $$V_{i'm'd'}^{j'} = -\int_{S_{i'}} \Phi(\vec{r}_{i'}) v_{i'md}^*(\vec{r}_{i'}) dS_i.$$

After applying the same inner products with other basis functions in the $i^{th}$ conductor, all voltage equations may be combined into the following submatrix equation that represents the interactions between all modes in two conductors i and j.

$$(R_{ij} + j\omega L_{ij})I_j = \Delta V_i^j \quad (21)$$

$$P_{i'j'}Q_{j'} = V_{i'}^{j'},$$

where $$R_{ij} = \begin{pmatrix} R_{p,i0,j0} & R_{p,i0,j1d} & \cdots & R_{p,i0,jNq} \\ R_{p,i1d,j0} & R_{p,i1d,j1d} & \cdots & R_{p,i1d,jNq} \\ & & \ddots & \\ R_{p,iMq,j0} & R_{p,iMq,j1d} & \cdots & R_{p,iMq,jNq} \end{pmatrix},$$

$$L_{ij} = \begin{pmatrix} L_{p,i0,j0} & L_{p,i0,j1d} & \cdots & L_{p,i0,jNq} \\ L_{p,i1d,j0} & L_{p,i1d,j1d} & \cdots & L_{p,i1d,jNq} \\ & & \ddots & \\ L_{p,iMq,j0} & L_{p,iMq,j1d} & \cdots & L_{p,iMq,jNq} \end{pmatrix},$$

$$I_j = (I_{j0} \quad I_{j1d} \quad \cdots \quad I_{jNq})^T,$$

and $$\Delta V_i^j = (V_{i0}^j \quad V_{i1d}^j \quad \cdots \quad V_{iMq}^j)^T.$$

Finally, all the submatrix equations between conductor segments form the global impedance and admittance matrix equation that contains loss and inductive coupling in the entire conductor system. The size of the global impedance matrix is approximately $(N_c N_m) \times (N_c N_m)$, where $N_c$ and $N_m$ are the number of conductor segments and the required number of modes for a conductor, respectively. $N_m$ is one when only the skin-effect-mode is used, and is more than one when additional proximity-effect modes are used. Since practically sufficient number of proximity-effect-mode basis pairs is two or three for an accurate description of current crowding, the required memory is considerably reduced compared to that of the classical PEEC method. Controlling the number of proximity-effect bases to be discussed below further reduces the computational cost.

2) Partial impedances and admittances: The calculations of partial resistances and inductances in equation (20), which are involved with sixfold integrals of frequency-dependent integrands, may be computationally expensive. In order to reduce calculation time, this section discusses analytical expressions and other numerical integration techniques.

For the partial resistances, indefinite integrals are easily found, and the mutual resistances vanish because of the local and orthogonal properties of the cylindrical conduction mode basis functions. Therefore, the global matrix of partial resistances becomes diagonal.

$$R_{p,imd,jnq} = \begin{cases} \frac{\pi\delta^2 \rho_i l_i}{\sigma |A_{i0}|^2} \Im(\alpha J_0^*(\alpha\rho_i) J_1(\alpha\rho_i)) & i = j, m = n = 0 \\ \frac{\pi\delta^2 \rho_i l_i}{2\sigma |A_{im}|^2} \Im(\alpha^* J_{m-1}^*(\alpha\rho_i) J_m(\alpha\rho_i)) & i = j, m = n \neq 0, \\ & d = q \\ 0 & \text{otherwise} \end{cases} \quad (22)$$

The partial resistance from the skin-effect-mode is actually identical to the analytic internal resistance formula of a cylinder discussed in a book by C. R. Paul, Analysis of Multiconductor Transmission Lines. New York, Wiley, 1994.

In contrast to the partial resistances, fully closed-form expressions of the partial inductances are not found, so a complicated numerical multiple integral is required. However, analytic integrations over three variables reduce the original sixfold integral to the following triple integral.

$$L_{p,imd,inq} = \frac{\mu}{8\pi} \int_0^{\rho_i} \int_0^{\rho_i} \int_0^{2\pi} \rho\rho' \frac{J_m^*(\alpha\rho) J_n(\alpha\rho')}{A_{im}^* A_{in}} I_{\varphi\Sigma} I_z d\varphi_\Delta d\rho' d\rho, \quad (23)$$

where $$I_{\varphi\Sigma}(\varphi_\Delta) = \begin{cases} 8\pi - 4\varphi_\Delta & m = n = 0 \\ 2(2\pi - \varphi_\Delta)\cos(n\varphi_\Delta) + \frac{2}{n}\sin(n\varphi_\Delta) & m = n \neq 0, \\ & d = q \\ \frac{4(-1)^{m+n+1}}{m^2 - n^2} \begin{bmatrix} m\sin(m\varphi_\Delta) - \\ n\sin(n\varphi_\Delta) \end{bmatrix} & m \neq n, \\ & d = q(PE - d) \\ \frac{4(-1)^{m+n+1}}{m^2 - n^2} \begin{bmatrix} n\sin(m\varphi_\Delta) - \\ m\sin(n\varphi_\Delta) \end{bmatrix} & m \neq n, \\ & d = q(PE - q) \\ 0 & \text{otherwise,} \end{cases}$$

$$I_z(D, l_i) = 2\left(\sqrt{D^2} - \sqrt{l_i^2 + D^2}\right) + l_i \log\left[\frac{l_i^2 + \sqrt{l_i^2 + D^2}}{-l_i^2 + \sqrt{l_i^2 + D^2}}\right],$$

and $$D^2(\rho, \rho', \varphi_\Delta) = \rho^2 + \rho'^2 - 2\rho\rho'\cos[\varphi_\Delta - (\varphi_{imd} - \varphi_{inq})].$$

$D^2(\rho, \rho', \phi_\Delta)$ is the distance between two points on the cross sectional plane. $\phi_\Delta$ is a new angular variable that is obtained from the following coordinates transform of $\phi$ and $\phi'$, which is useful for both reducing computational cost and avoiding singularity during numerical integrations.

$$\begin{pmatrix} \varphi_\Delta \\ \varphi_\Sigma \end{pmatrix} = \begin{pmatrix} 1 & -1 \\ 1 & 1 \end{pmatrix} \begin{pmatrix} \varphi \\ \varphi' \end{pmatrix}. \quad (24)$$

Since Green's function is not a function of $\phi_\Sigma$, indefinite integral over $\phi_\Sigma$ reduces one of the six numerical integrals. During the remaining numerical integrals, singular points of the integrands are concentrated on a line where both $\phi_\Delta=0$ and $\rho=\rho'$ hold, so the numerical integration can easily avoid the singular line.

For the calculation of the partial mutual inductances, the inductance formula in equation (20) may be rewritten with the following frequency-dependent and frequency-independent parts.

$$L_{p,imd,jnq} = \frac{\mu}{4\pi} \int_{\rho_j,\rho_i} \rho_i \rho_j \frac{J_m^*(\alpha\rho_i)J_n(\alpha\rho_j)}{A_{imd}^* A_{jnq}} I_{z,\varphi} \, d\rho_i d\rho_j, \quad (25)$$

where $$I_{z,\varphi}(\rho_i, \rho_j) = \int_{\varphi_j,\varphi_i} \cos(\varphi_i - \varphi_{i,d})\cos(\varphi_j - \varphi_{j,q}) \times$$

$$\int_{z_j,z_i} \frac{(\hat{z}_i \cdot \hat{z}_j)}{|\vec{r}_i - \vec{r}_j|} dz_i dz_j d\varphi_i d\varphi_j.$$

The frequency-independent $I_{z,\varphi}(\rho_i,\rho_j)$ is composed of analytic integral over $(z_i,z_j)$ and the other numerical integral over $(z_i,z_j)$.

Figure 4:
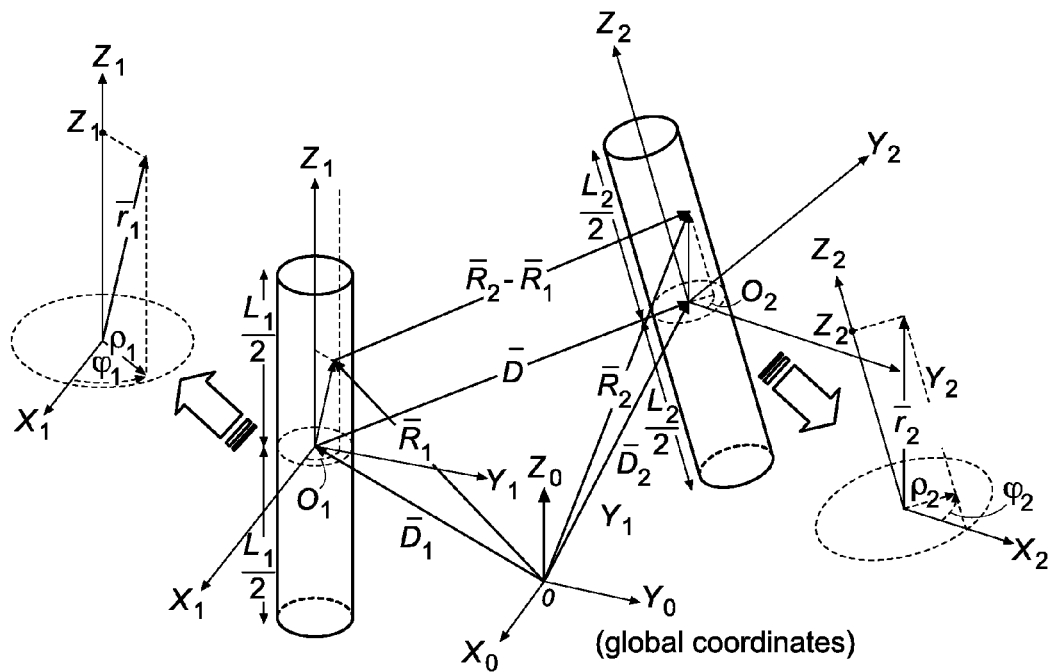
FIG. 4 defines the orientation parameters between two separate cylinder segments.

For the calculation of the analytic integral, the distance between two points in two different conductor segments should be formulated with defined orientations. In FIG. 4, translations and rotations (based on Euler angles) can be determined from the defined global coordinates. Then, each point in a conductor is specified with the local cylindrical coordinates, which are actually related to the cylindrical conduction mode basis functions. With the calculated distance, indefinite integrals for axial variables $(z_i,z_j)$ can be obtained. This analytical expression is more generalized than that of the two thin conductor filaments discussed by S. Ray, et al., "Closed Form Expression for Mutual Partial Inductance between Two Skewed Linear Current Segments," in *Proc. Antennas and Propagation Society International Symposium*, pp. 1278-1281, July 1999, since it contains local coordinate variables that represent the inside of the two conductor segments.

To reduce total frequency sweep time, the frequency-independent integrals can be computed before a sweep simulation. During the numerical integration over $(\rho_i,\rho_j)$, the pre-computed frequency-independent $I_{z,\phi}$ will be multiplied by the frequency-dependent integrands. One issue of this approach is that storing the values of $I_{z,\phi}$s for every point of $(\rho_i,\rho_j)$ requires a large amount of memory. Fortunately, the memory requirement can be reduced by using the property that $I_{z,\phi}(\rho_i,\rho_j)$ is a "smooth" bivariate function. That is, the variations in the frequency-independent part of the integrand are smaller than those in the frequency-dependent Kelvin functions. Therefore, after computing integration values for the small number of data points, the following simple interpolation formula can be used.

$$I_{z,\varphi}(\rho_i, \rho_j) \simeq (1-s)(1-t)I_{p,q} + \quad (26)$$

$$s(1-t)I_{p,q+1} + (1-s)tI_{p+1,q} + stI_{p+1,q+1},$$

where $0 \leq s, t \leq 1$ are interpolation parameters, and $I_{p,q}$ are sampled points near $(\rho_i,\rho_j)$. The total number of the sampled points is determined adaptively according to the variation of Green's function. For integrals over the remaining four variables $(\rho_i,\rho_j,\phi_i,\phi_j)$, several numerical quadrature techniques such as adaptive Lobatto quadrature discussed in a book by W. H. Press, S. A. Teukolsky, et al., *Numerical Recipes in C—The Art of Scientific Computing*, 2nd ed. Cambridge, U. K., Cambridge Univ. Press, 1995 are used.

Self and mutual partial coefficients of potential $Pp_{i'm'd'j'n'q'}$, in equation (20), which are combination of parallel conductances and capacitances, can be computed in a similar way as it is done for the partial inductances. Actually, the computational cost is reduced since the multiple integrals are involved with four variables $(\phi_i,\phi_j,z_i,z_j)$, and the accumulation bases are frequency independent. The capacitance calculation using similar harmonic modal bases can be found from J. B. Faria and M. G. das Neves, "Accurate Evaluation of Indoor Triplex Cable Capacitances Taking Conductor Proximity Effects into Account," *IEEE Trans. Power Delivery*, vol. 21, pp. 1238-1244, July 2006. Compared to the original work, the proposed method is more generalized for the capacitance calculation of arbitrary oriented conductors and is able to extract modal capacitance network. In case of modeling through-silicon via interconnections, partial conductances can be found by using complex permittivity ($\epsilon = \epsilon' - j\epsilon''$), which represents lossy media.

3) Equivalent circuit: In addition to the calculated partial resistances and inductances, the following modal voltage difference should be considered to generate the global impedance matrix equation and corresponding equivalent circuit.

$$V_{imd} = \sum_j V_{imd}^j, \quad (27)$$

where $V_{imd}^j$s are modal voltages induced by the $j^{th}$ current density in equation (20). Since the integral over the lateral surface of a cylinder is zero, $V_{imd}$ may be simplified to the integral over the inlet and the outlet planes ($S_i^-$ and $S_i^+$, respectively) as follows.

$$V_{imd} = -\int_{S_i^+} \Phi(\vec{r}_+)\vec{w}_{imd}^*(\vec{r}_i, \omega) \cdot d\vec{S}_i^+ - \int_{S_i^-} \Phi(\vec{r}_-)\vec{w}_{imd}^*(\vec{r}_i, \omega) \cdot d\vec{S}_i^-, \quad (28)$$

where the potentials $\Phi(\vec{r}_+)$ and $\Phi(\vec{r}_-)$ are assumed to be constant over the cross sections.

When the skin-effect-mode basis is involved, the integrals of $\vec{w}_{imd}^*$ in equation (28) are unities since the basis functions are normalized, as discussed above. Thus, the modal potential difference becomes the actual voltage difference between the two nodes. In the case where the proximity-effect-mode bases are involved, the modal potential difference becomes zero since the integrals of the harmonic functions in the higher-order bases vanish. Thus, the global impedance matrix equation is expressed as follows:

$$\begin{pmatrix} Z_{ss} & Z_{sp} \\ Z_{ps} & Z_{pp} \end{pmatrix} \begin{pmatrix} I_s \\ I_p \end{pmatrix} = \begin{pmatrix} \Delta V_i \\ 0 \end{pmatrix}, \quad (29)$$

where $Z_{ss}$, $Z_{sp}$, $Z_{ps}$, and $Z_{pp}$ are partial impedances grouped by skin-effect and proximity-effect modes, $I_s$ and $I_p$ are skin- and proximity-effect currents, and $\Delta V_i$ is the voltage difference across a conductor segment.

Figure 5A:
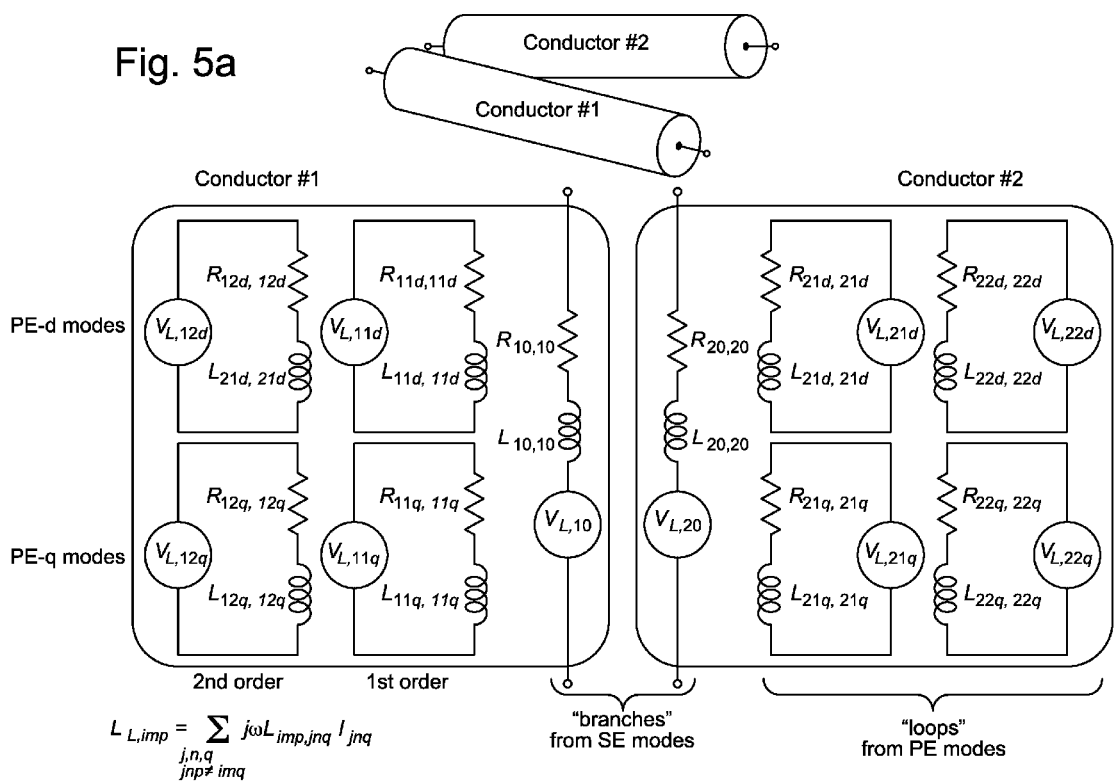
Figure 5B:
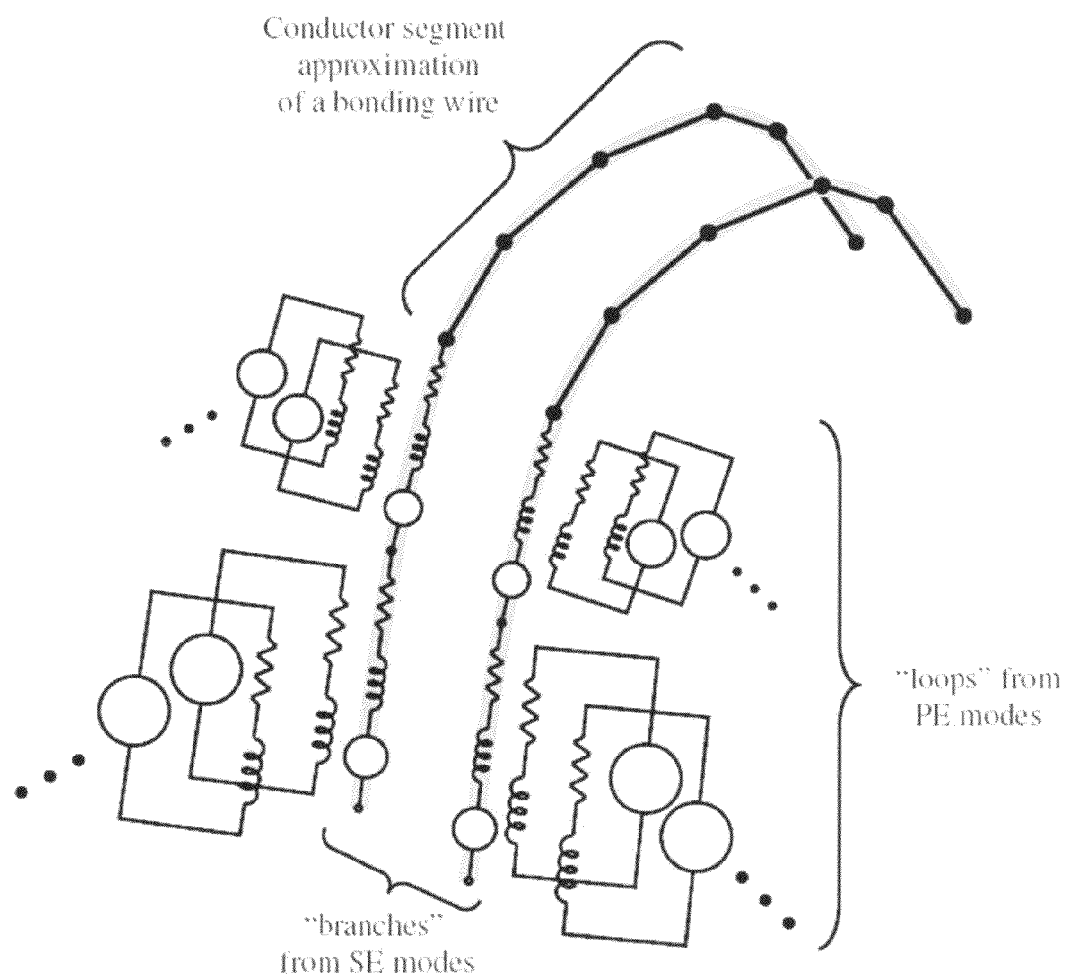

In the viewpoint of circuit topology, the equivalent circuit generated from the proximity-effect-mode basis function forms a closed loop like a shielded conductor, which is inductively coupled with the other circuits. In an example of the equivalent circuit of two conductor segments (FIG. 5a), two branches are generated from the skin-effect-mode partial components, and eight loops come from four orthogonal pairs of two proximity-effect modes. The number of proximity-effect-mode loops is variable according to the strength of the proximity effect. Extending the two-conductor model, FIG. 5b illustrates a general equivalent network of coupled three-dimensional bonding wires. The wires are approximated to the connections of several straight conductors, and the physical connection nodes are identical to the circuit nodes of the skin-effect branches.

By combining the resistance-inductance (R-L) network in FIG. 5 with parallel conductance-capacitance (G-C) networks, multiport network parameters such as Z- and S-parameters can be obtained. Currents in the final resistance, inductance, conductance, capacitance (RLGC) network are related by the following Kirchoff current law (KCL) equation, which comes from the continuity equation of conduction and displacement currents.

$$\sum_i I_{i0} + j\omega Q_{i'0} = 0. \tag{30}$$

Efficiency Enhancement and Implementation

The techniques discussed above have the benefit of the equivalent network's system matrix (29) being much smaller than the matrix of the classical PEEC method. However, calculation of the partial impedances using equation (20) for each frequency step is more complicated than the classical PEEC method. Therefore, for the modeling of real three-dimensional interconnections in system-in-package modules, the further reduction of computational cost is necessary.

Controlling the Number of Proximity-Effect-Mode Basis Functions

Figure 6:
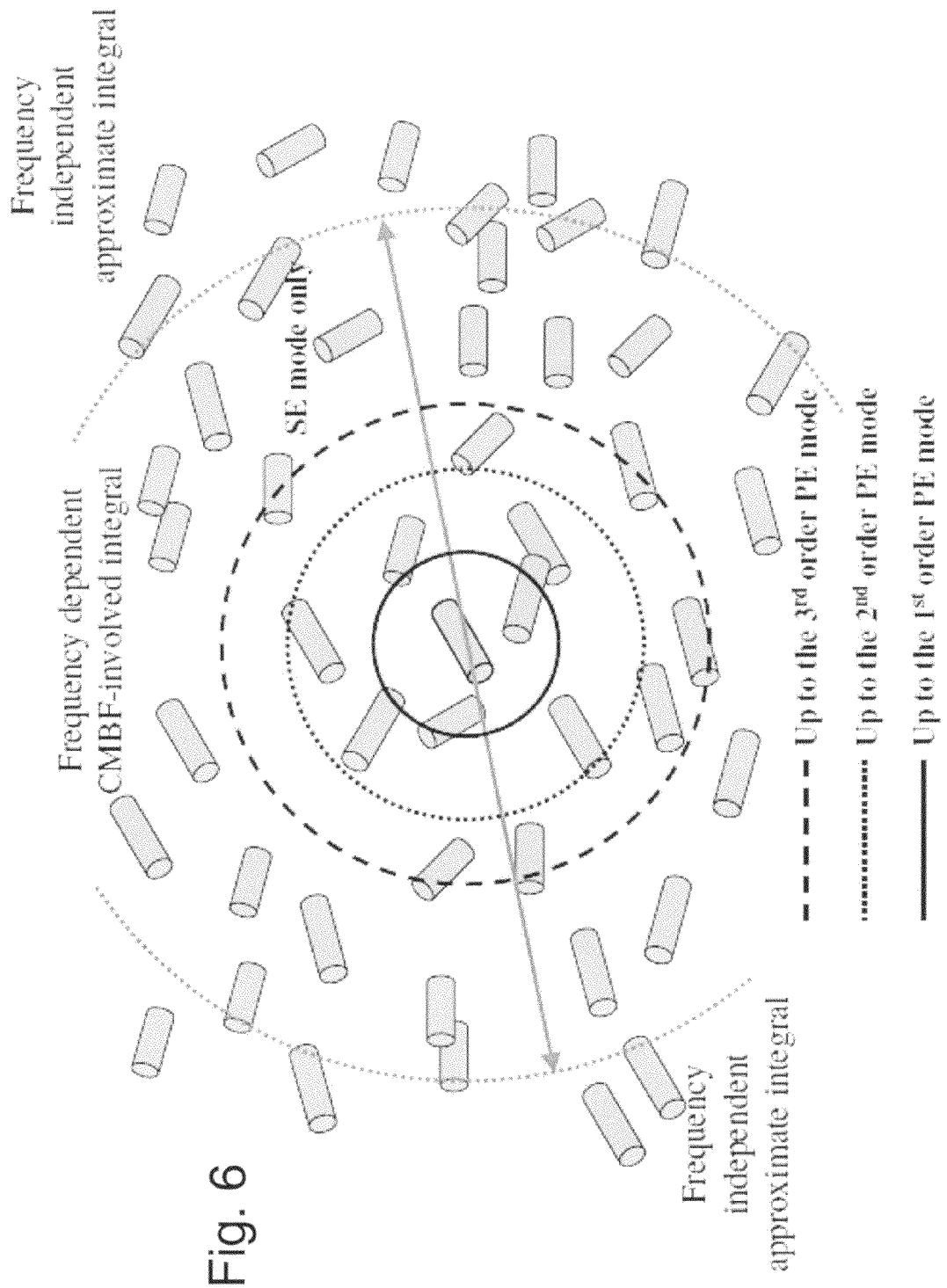
FIG. 6 is a conceptual diagram of efficiency enhancement schemes.

One of the ideas for reducing computational cost is to use the number of higher-order (proximity-effect-mode) bases differently for each neighboring conductor, such as is disclosed by the present inventors in "Wideband Electrical Modeling of Large Three-Dimensional Interconnects using Accelerated Generation of Partial Impedances with Cylindrical Conduction Mode Basis Functions," in *Proc. IEEE MTT-S International Microwave Symposium*, pp. 1297-1300. A different number of higher-order bases can be assigned to each conductor, because calculations related to the higher-order basis functions are not necessary when the distance between two conductors is sufficiently large, or when the coupling coefficient is small enough. In other words, to maintain accuracy, conductors are grouped according to different coupling levels as illustrated in FIG. 6. Besides reducing computational cost, memory for storing non-zero elements can be saved, because such grouping enables the higher-order sub-matrices ($Z_{sp}$, $Z_{ps}$, and $Z_{pp}$) of the partial impedance matrix become sparse, as discussed below (see FIG. 15).

Figure 7:
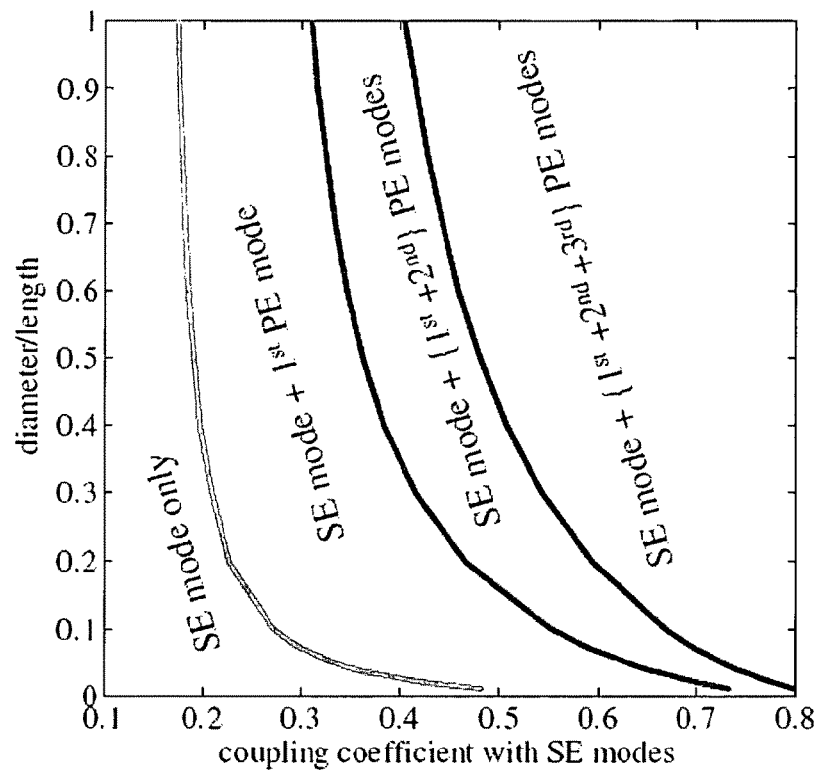
FIG. 7 is a graph that shows Relative error boundaries that defines the required cylindrical conduction mode basis functions at 10 GHz (from copper two-parallel-conductor experiment.

The two key parameters that determine the number of proximity-effect-mode basis functions are the initial coupling coefficient and the aspect ratio of diameter to length of cylinders. The higher initial coupling coefficient, which is obtained with skin-effect-mode bases only, requires higher-order proximity-effect-mode basis functions, as found in numerical experiments of two parallel cylindrical conductors with various diameters and pitches. Comparably, conductors having the larger aspect ratio need more number of basis functions. Computing relative errors in coupling coefficients for various aspect ratios and initial coupling coefficients, boundaries may be drawn in FIG. 7 that indicates required number of basis functions under a defined error bound ($10^{-3}$ for example).

Multi-Function Method

In addition to the proximity-effect-mode order reduction, approximate integrals can be simplified for reducing the computational cost to generate $Z_{ss}$. Since the approximations are frequency-independent, the number of $Z_{ss}$ elements to be calculated is reduced during frequency sweep. Therefore, the computational effort of generating the dense matrix becomes that of generating a banded matrix.

When the two conductors are sufficiently separated (FIG. 6), the variations of current density in conductors are negligible. Thus, the following thin-filament approximation can be used instead.

$$L_{p,i,j} = \frac{\mu}{4\pi} \int_{z_i} \int_{z_j} G(\vec{r}_i, \vec{r}_j) dz_j dz_i. \tag{31}$$

Figure 8:
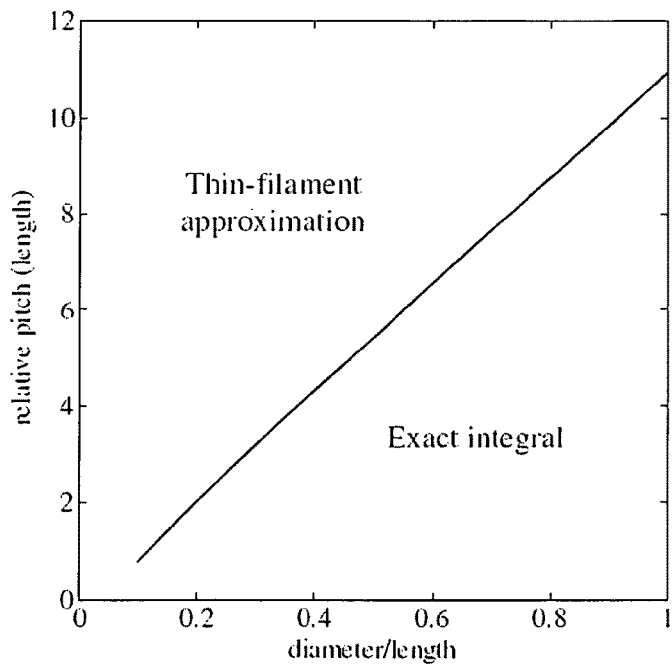
FIG. 8 is a graph that shows error thresholds of using the thin-filament approximation as a function of diameter per length at 10 GHz.

The integrand in the above double integral does not contain frequency-dependent conduction mode basis functions, and can be calculated in analytic way for any orientation of two straight conductor segments, such as is discussed by S. Ray, et al., "Closed Form Expression for Mutual Partial Inductance between Two Skewed Linear Current Segments," in *Proc. Antennas and Propagation Society International Symposium*, pp. 1278-1281, July 1999. The accuracy of the thin-filament approximation is ensured when the distance between conductors are sufficiently large. The numerical experiments of two parallel cylinders with various dimensions show that the relative error of the thin-filament approximation from the exact integral depends on the aspect ratio of diameter to length of a cylinder, as in the case of the proximity-effect-mode order reduction. FIG. 8 shows the boundary where the thin-filament approximation is available for maintaining the relative error less than $10^{-3}$. The threshold pitch of using the frequency-independent approximations is usually higher than that of reducing higher-order bases.

For a conductor system occupying a very large dimension, the following center-to-center approximation proposed by G. Antonini and A. E. Ruehli, "Fast Multipole and Multifunction PEEC Methods," *IEEE Trans. Mobile Computing*, vol. 2, pp. 288-298, October-December 2003 is also available.

$$L_{p,i,j} = \frac{\mu}{4\pi} \frac{l_i l_j}{R_{ij}}, \tag{32}$$

where $l_i$, $l_j$, and $R_{ij}$ are the length of the $i^{th}$ and the $j^{th}$ conductor, and the distance between the centers of the two conductors, respectively. From a similar numerical experiment, the relative pitch (with respect to length) where the center-to-center approximation is available is about 9.12, regardless of the cylinder lengths.

Implementation of the Modeling Tool

Figure 9:
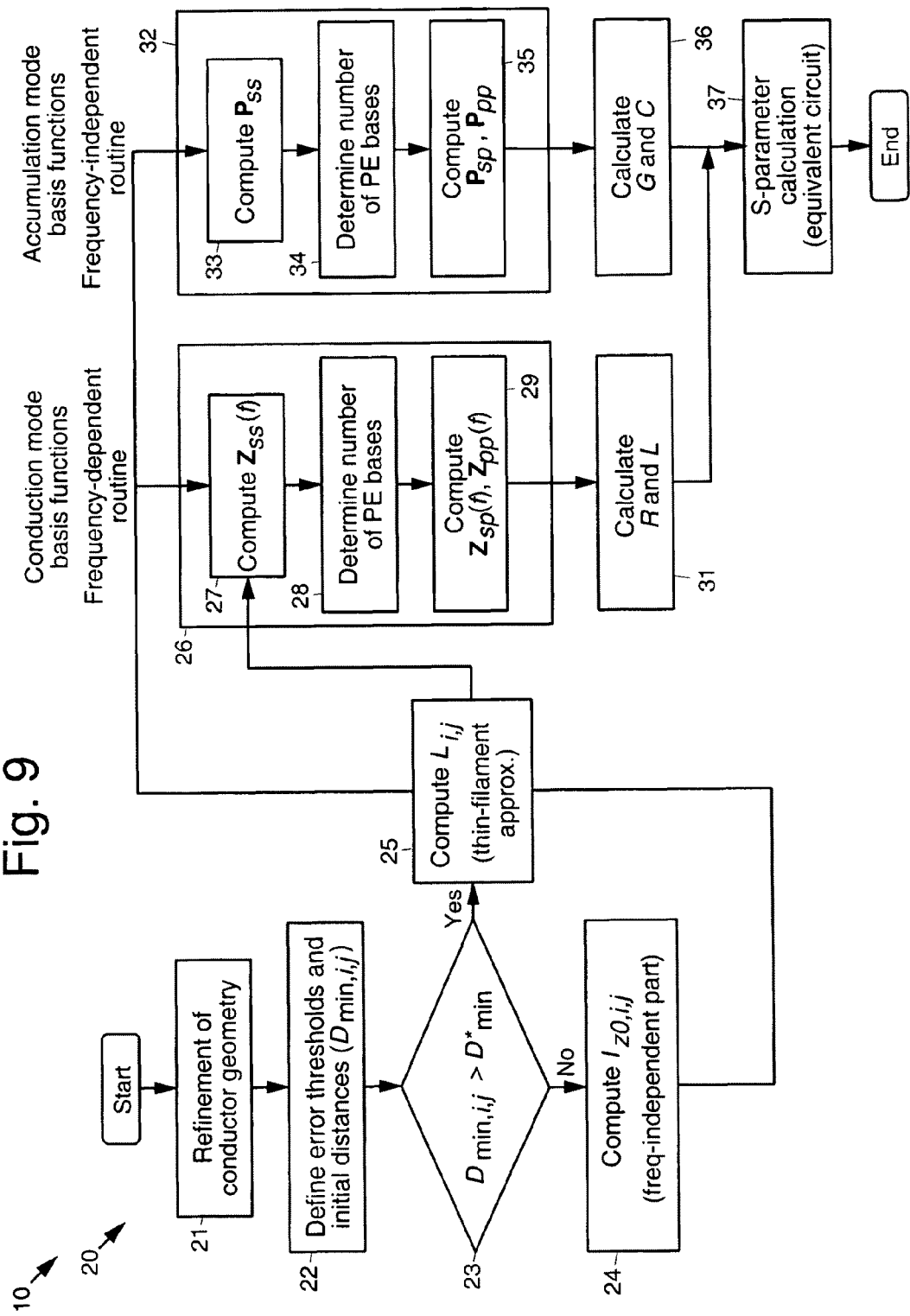
FIG. 9 is a flow chart that illustrates an exemplary three-dimensional resistance, inductance, conductance, capacitance (RLGC) extraction tool comprising exemplary electrical modeling apparatus, methods and software employing cylindrical conduction and accumulation mode basis functions.

Based on the discussed impedance calculation and efficiency enhancement schemes, an inductance extraction tool was developed. FIG. 9 is a flow chart that illustrates an exemplary three-dimensional inductance extraction tool comprising exemplary electrical modeling apparatus 10 (or computer 10), methods 20 and software employing cylindrical conduction mode basis functions. The flow chart shown in FIG. 9 illustrates how procedures for controlling proximity-effectmode bases and the multi-function method 20 are combined with the basic impedance computation routine.

In the beginning of the procedure, the availability of using the multi-function method is tested for every pair of conductors. The conductor geometry is refined based upon the desired modeling frequency in step 21, wherein, depending upon frequency, individual conductor segments are discretized as required. Error bounds and initial distances are defined between the pair of conductors in step 22. The distance between the conductors is compared to the defined threshold distance in step 23. If the distance between the conductors is larger than the defined threshold distance, a thin-filament approximate integral is computed to define the frequency-independent mutual inductance in step 25. If the distance is not large enough for the approximation, sampled values of the frequency-independent integral $I_{z,\phi}$ are computed in step 24 before a frequency sweep simulation. The frequency sweep simulation comprises a frequency-dependent routine 26 and a frequency-independent routine 32. The frequency-dependent routine 26 calculates conduction mode basis functions and the frequency-independent routine 32 calculates accumulation mode basis functions.

During the frequency sweep simulation 25, and in particular during the frequency-dependent routine 26, impedances from skin-effect-modes ($Z_{ss}$) are computed in step 27. Coupling coefficients found from $Z_{ss}$ determine the required number of proximity-effect-mode basis functions (PE bases) in step 28 by using the diagram shown in FIG. 7. The total number of proximity-effect-mode bases determine the size of skin-effect and proximity-effect impedances $Z_{pp}$ and $Z_{sp}$, which values are computed at the latter part of the frequency sweep in step 29. Finally, conductor and wire impedances ($Z_c$ and $Z_w$) (i.e., resistance and inductance) are found from matrix equation (29) in step 31.

During the frequency-independent routine 32, the coefficient of potential ($P_{ss}$) is computed in step 33. Coupling coefficients found from $P_{ss}$ determine the required number of proximity-effect-mode basis functions (PE bases) in step 34. The total number of proximity-effect-mode bases determine the size of $P_{pp}$ and $P_{sp}$, which values are computed in a latter part of the frequency sweep in step 35. conductance and capacitance values are calculated in step 36. Finally, S-parameters (corresponding to the equivalent circuit) are determined in step 37, which may be achieved in a conventional manner, such as by using equations disclosed in the book by C. R. Paul "Analysis of Multiconductor Transmission Lines," John Wiley & Sons 1994, for example.

Validation

The accuracy of the disclosed method may be validated from a comparison with an existing simulation tool. Also, the efficiency of the disclosed method is demonstrated show the efficiency of the disclosed method with its applications to large interconnection structures.

Accuracy Validation

Figure 10A:
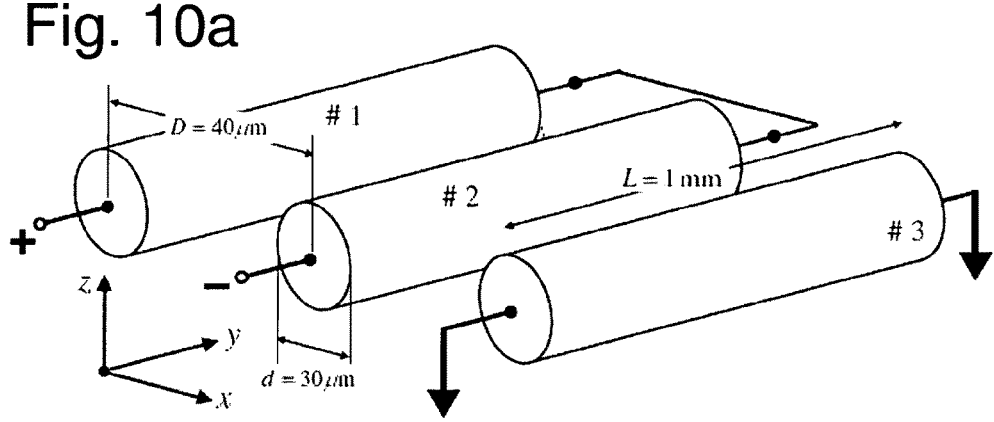
FIGS. 10a and 10b show the geometry associated with three parallel cylindrical copper conductors.
Figure 10B:
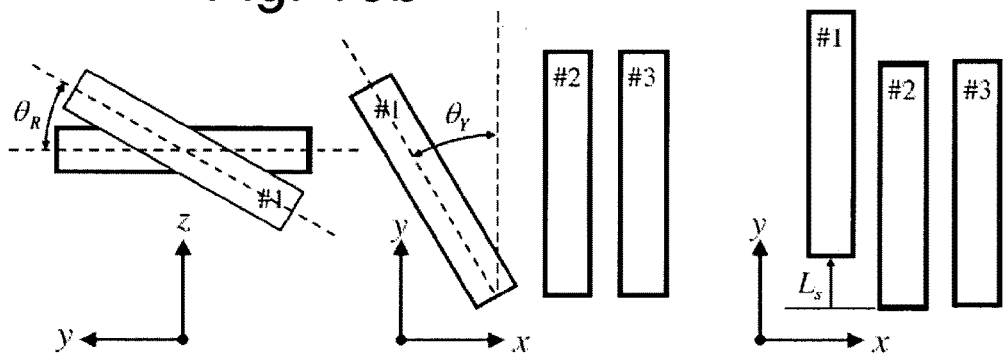

This section demonstrates simple three-conductor problems for evaluating the accuracy of the disclosed approach. The test structure is shown in FIGS. 10a and 10b, where two conductors are connected at the far end with the other conductor grounded. Since the accuracy of the disclosed method should be examined for arbitrary orientations of conductor segments, variations in rolling angle ($\theta_R$), yawing angle ($\theta_Y$), and parallel shift ($L_s$) of the conductor 1 were applied.

Figure 11:
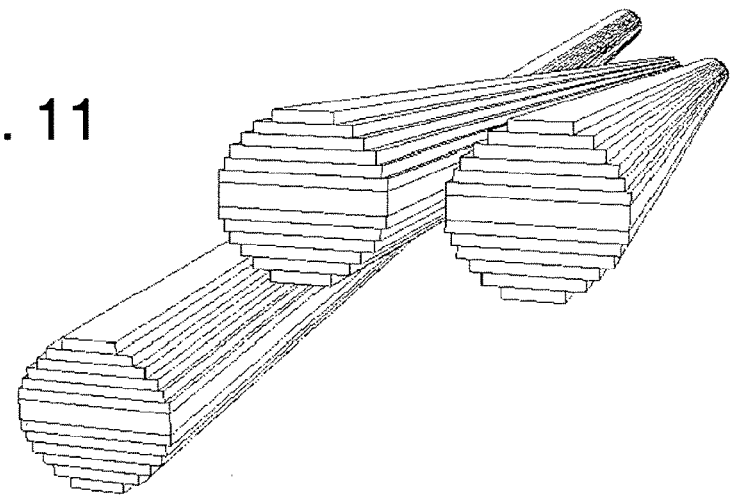
FIG. 11 illustrates discretized approximate model of cylindrical conductors in FastHenry.
Figure 12A:
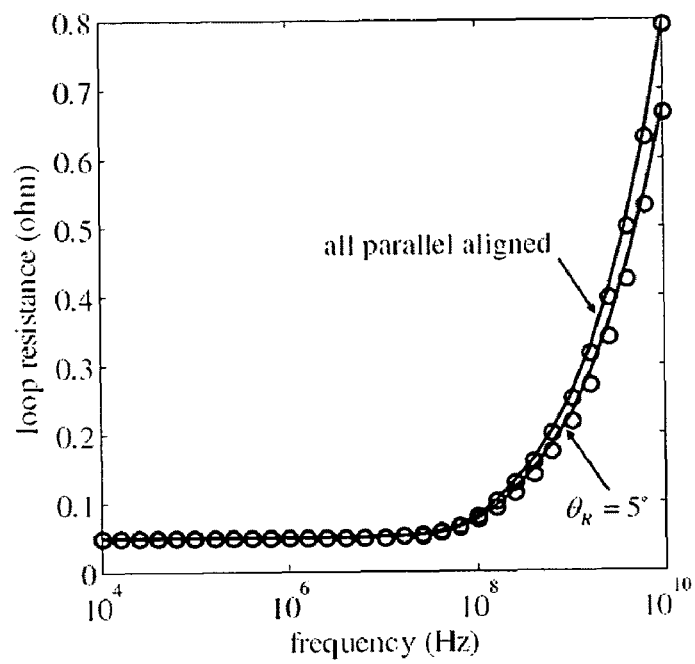
FIGS. 12a and 12b respectively illustrate loop resistances and inductances of cylindrical conductors with various geometric conditions.
Figure 12B:
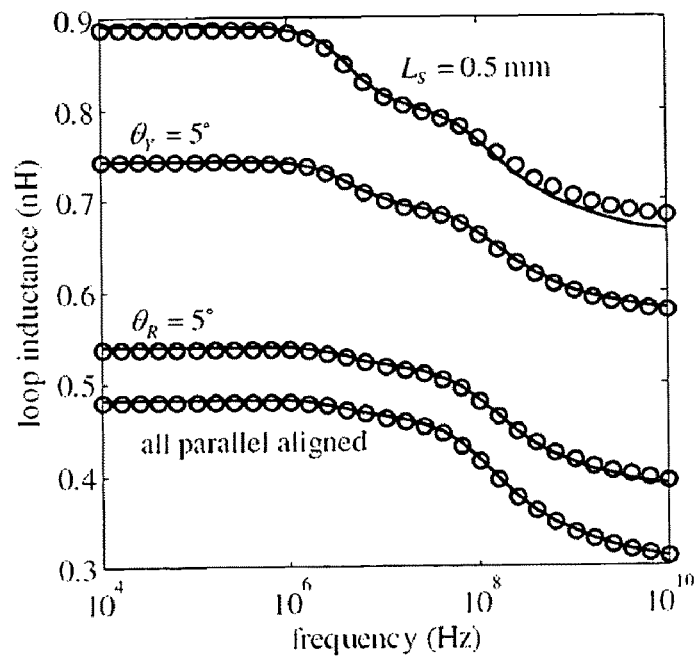

Loop resistances and inductances from these various situations are compared with the results from FastHenry discussed in the M. Kamon, et al. paper, which is an inductance extracting tool based on the PEEC method combined with fast multipole method (FMM). Since FastHenry uses brick-type filaments for modeling interconnection geometry, an approximate cylinder model was constructed with the brick elements, as shown in FIG. 11. FIGS. 12a and 12b show that the loop resistances and inductances obtained from the disclosed method and FastHenry are well matched for all geometric variations. Although high-frequency values in the case of the shifted conductor are a little different from two simulations, the error can be removed by segmentation in the axial direction. Compared to the parallel aligned configuration, all other loop inductances are higher due to the smaller mutual inductances.

Scalability Analysis with a Through-Hole Via Array

Figure 13:
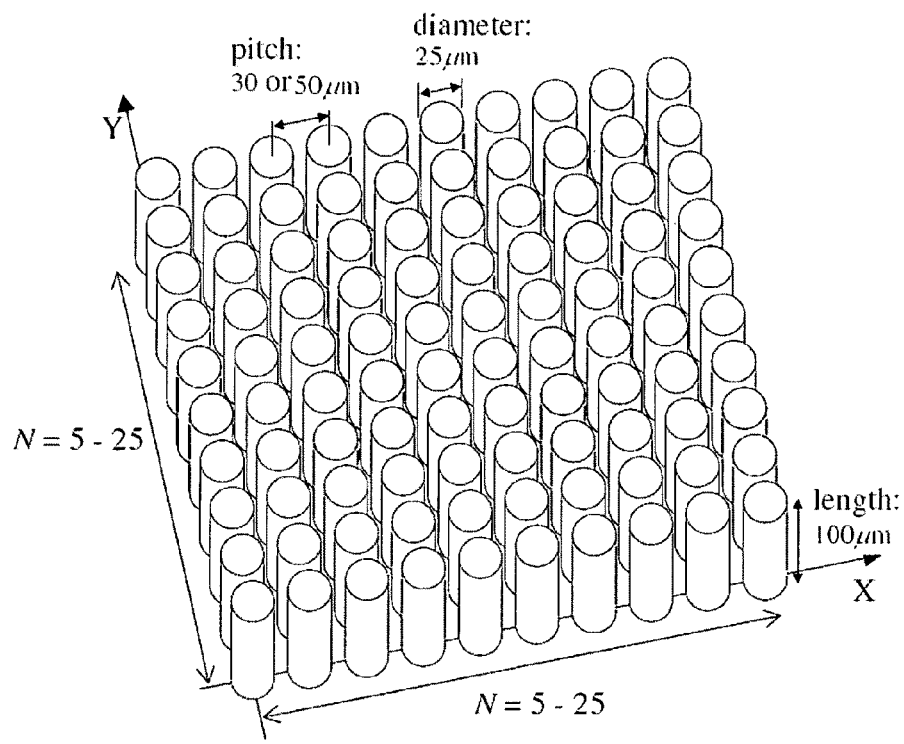
FIG. 13 illustrates an exemplary copper through-hole via array configuration.

This section shows required speed and memory for the modeling of the through-hole via array in FIG. 13 with increasing number of interconnections for two different pitches (30 and 50 μm). The through-hole via array is a good configuration to perform the scalability analysis of the disclosed method since it suffers from strong inductive couplings caused by the small pitch sizes. In addition, the electrical parameters of the through-hole via array are useful for predicting the characteristics of emerging interconnection structures such as through silicon via (TSV) and ball grid array (BGA) interconnections.

Figure 14A:
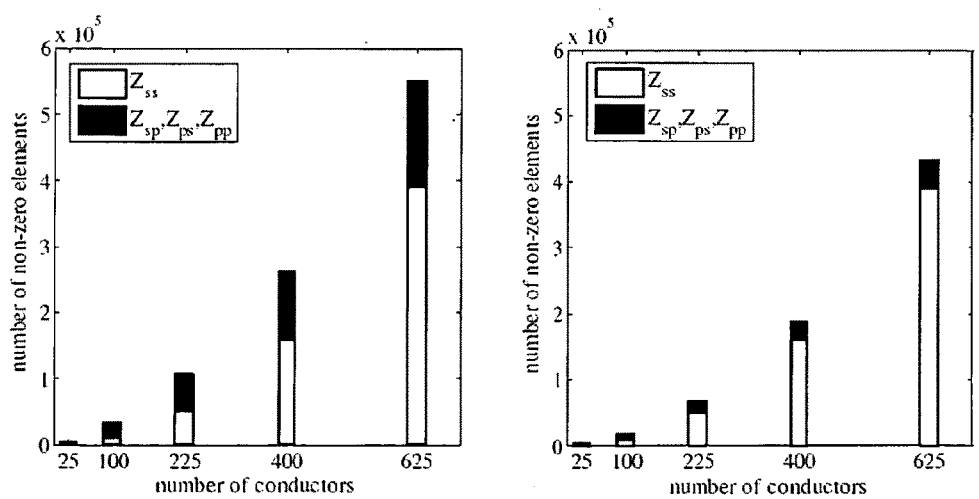
Figure 14B:
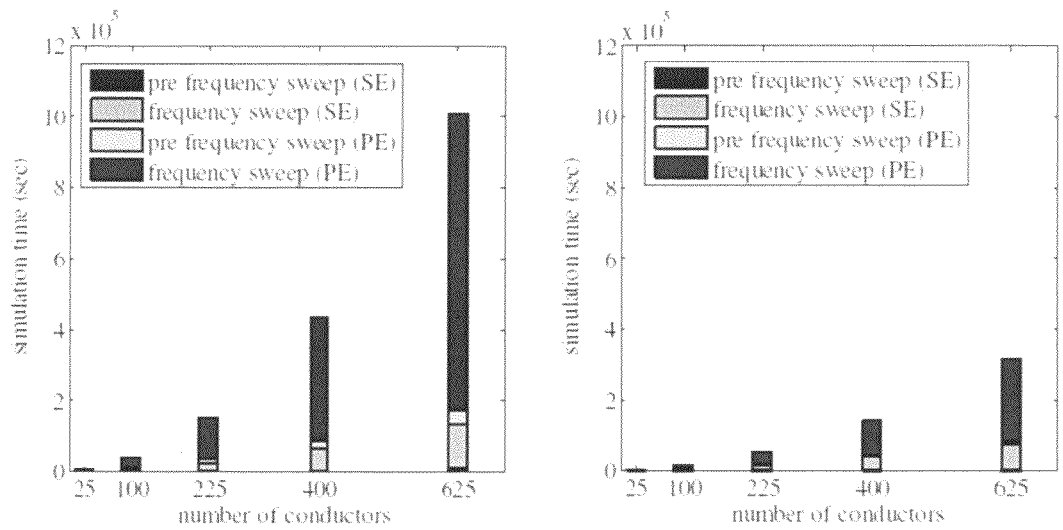
Figure 14C:
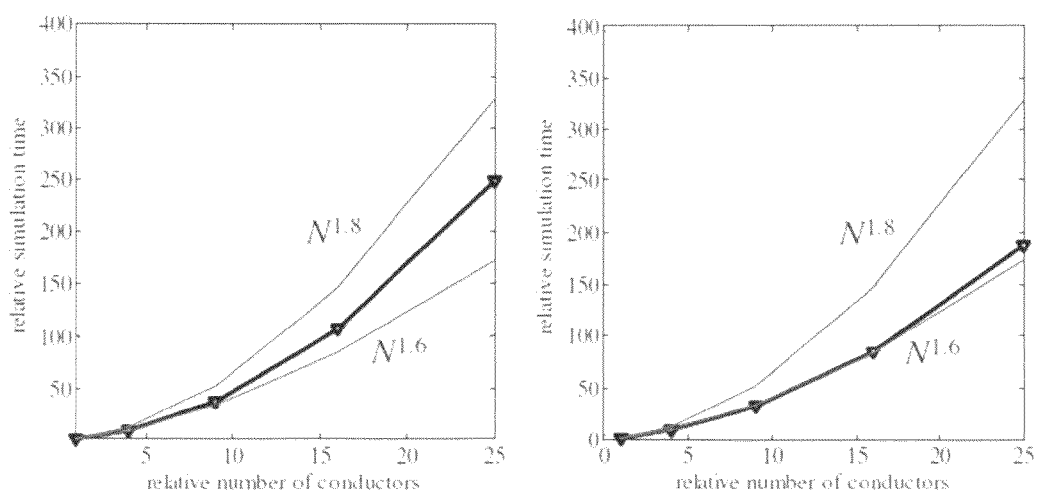

The dominant factor that determines simulation speed of the method 20 is the time for generating the system matrix, the measured values of which are shown in FIGS. 14a-14c for two different pitches. FIG. 14a shows the number of non-zero elements in the system matrix. Although the submatrix $Z_{ss}$ should be dense, controlling the number of proximity-effect-mode basis functions reduces the number of non-zeros in $Z_{pp}$ and $Z_{sp}$, as shown in the sparsity pattern of the system matrix of 20-by-20 through-hole via array problem (FIG. 15). The number of non-zero elements directly influence on the time for generating the system matrix in FIG. 14b, where times for performing separate tasks are indicated as well. Generating $Z_{pp}$ and $Z_{sp}$ takes more time than generating $Z_{ss}$ because numerical quadratures involving higher-order basis functions requires more time. In addition, the multi-function method reduces computation time for generating $Z_{ss}$. Finally, the relative time associated with increased number of conductors in FIG. 14c indicates that the computation time of the disclosed method is increased to between $O(N^{1.6})$ and $O(N^{1.8})$, where N is the number of conductors.

The overall computational cost is actually a function of the strength of inductive coupling. Compared to the case of 30 μm pitch, the increased pitch (50 μm) requires much less simulation time. Although today's design trend is to reduce the pitch size among interconnections, the pitch of 50 μm between conductors with the interconnect diameter of 25 μm is sufficiently small in current technology.

Figure 17A:
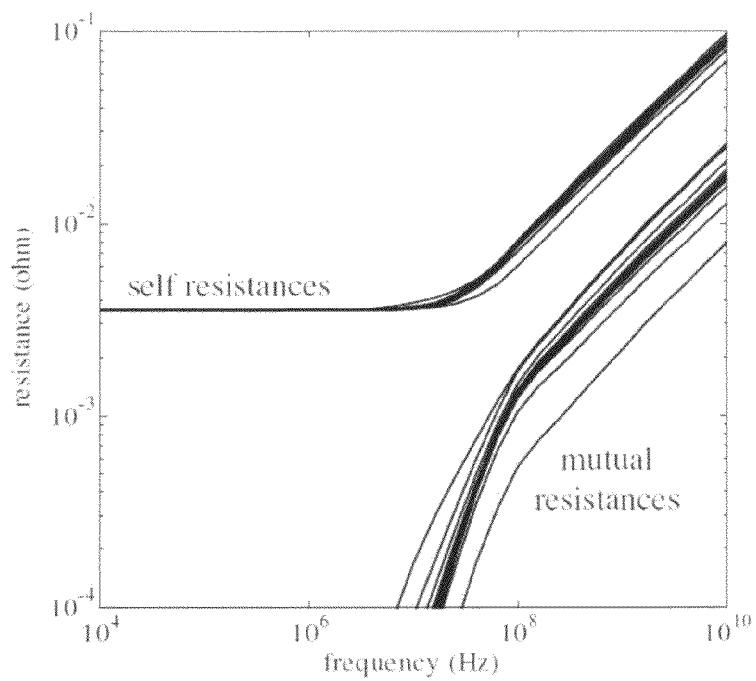
FIGS. 17a and 17b are graphs that show resistances and inductances of diagonal conductors in 20-by-20 through-hole via array.
Figure 17B:
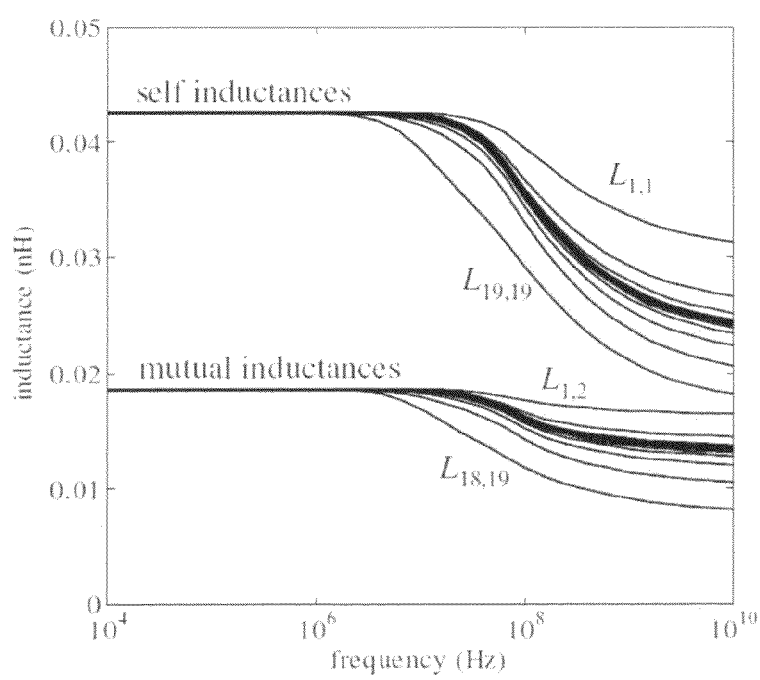

FIG. 16a-16d show current density distribution of 20-by-20 through-hole via array with an 'E'-shaped differential excitation. As frequency increases from $10^7$ to $10^9$ Hz, skin and proximity effects become dominant, resulting in current crowding along the boundary of the differently excited conductors. FIGS. 17a and 17b show resistances and inductances of 19 diagonal conductors with an edge conductor grounded. Different proximity effects and ground effects make the large variety of high-frequency resistances and inductances.

Large Three-Dimensional Bonding Wire Interconnection

Figure 18:
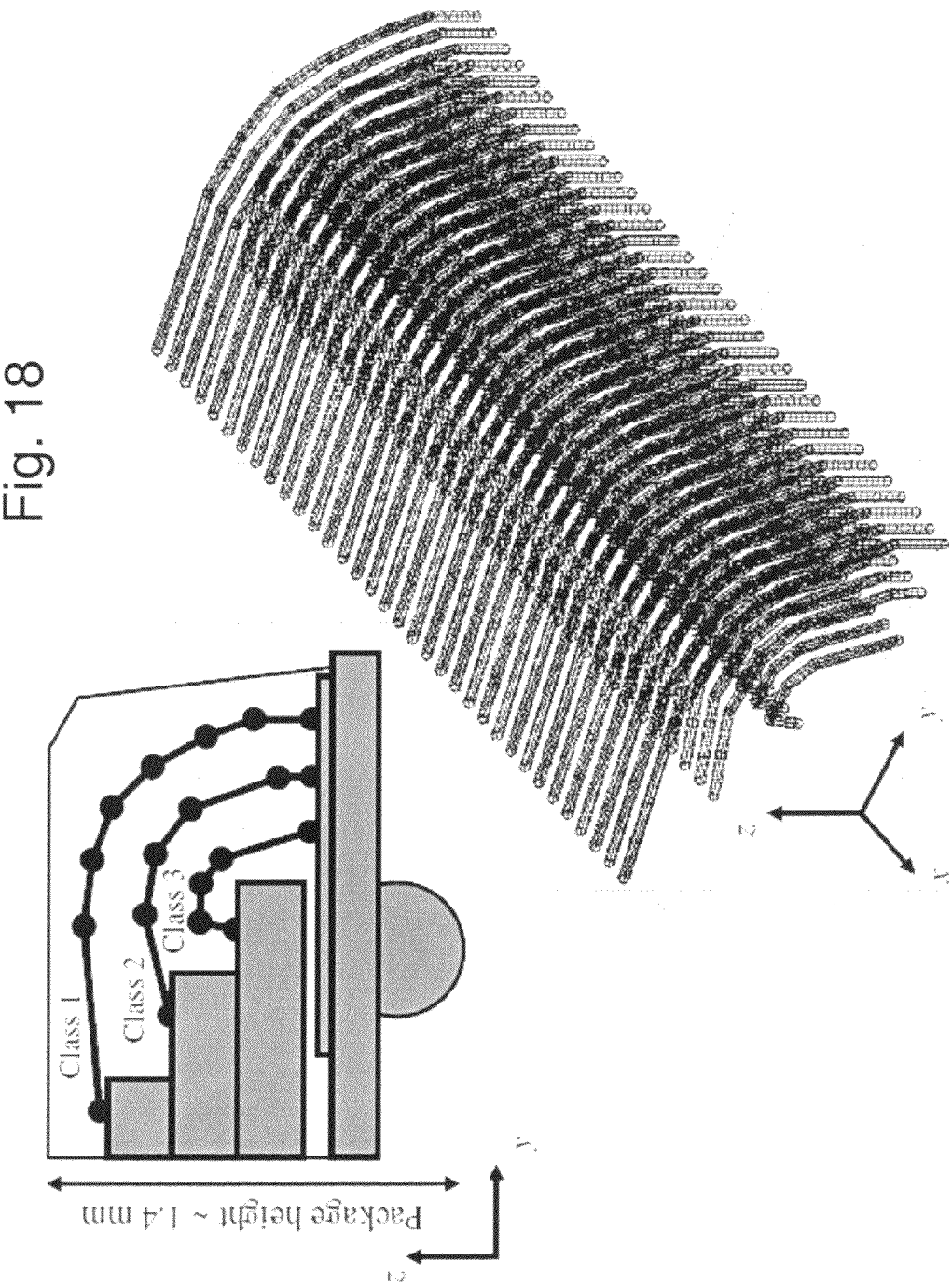
FIG. 18 illustrates gold bonding wires on three stacked integrated circuits.

In this section, parasitic elements of close-to-real bonding wires on three stacked ICs are extracted. The bonding wire structure in FIG. 18 is obtained approximately from the model of a triple-chip stacked chip-scale package (CSP) discussed by Y. Fukui, et al., "Triple-Chip Stacked CSP," in *Proc. IEEE Electronic Components and Technology Conference*, pp. 385-389, May 2000. Wire diameter is 25 μm, and the pitch between adjacent wires is 60 μm, which comes from an estimation of the state of the art, discussed by E. Milke, et al., "New Bonding Wire for Fine Pitch Applications," in *Proc. IEEE Electronics Packaging Technology Conference*, pp. 750-754, 2007. 34 wires are mounted for each stack, and all wires are in parallel. The approximate lengths of wires are 1.26 mm (class 1), 0.82 mm (class 2), and 0.48 mm (class 3), respectively.

Figure 19A:
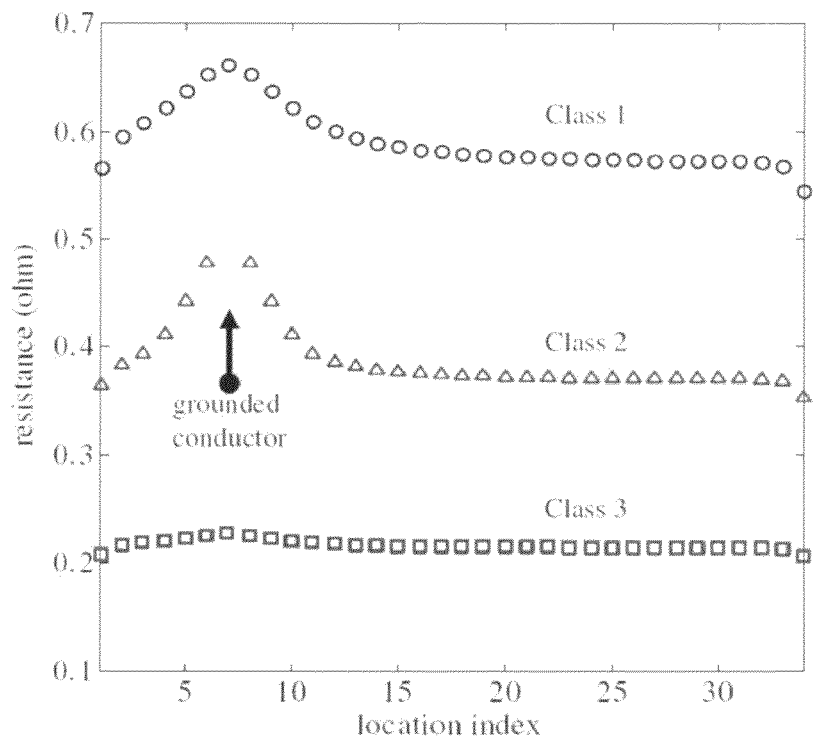
FIGS. 19a and 19b are graphs that show extracted bonding wire parasitics at 10 GHz with a wire in class 2 grounded.
Figure 19B:
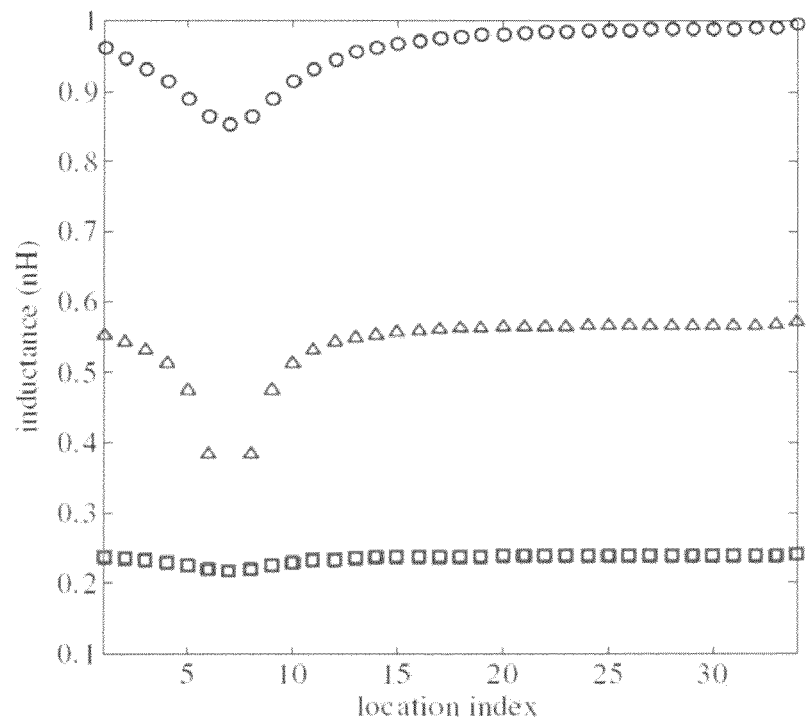

FIGS. 19a and 19b show resistances and self inductances of all bonding wires at 10 GHz, with one conductor of class 2 grounded. The ground conductor influences on adjacent wires as well as upper and lower wires, so the resultant high-frequency resistances and inductances become different. FIGS. 19a and 19b also show small variations of wire impedances in the edge of the structure, whose proximity effects are smaller than those in the middle of the structure. Capturing these parasitic variations at high-frequencies is useful for an efficient design of high-density three-dimensional interconnections for wide-band applications.

Thus, efficient methods, apparatus and software have been disclosed to extract frequency-dependent impedances and admittances from a large number of interconnections that are used in today's three-dimensional packaging. Unlike conventional techniques, the disclosed techniques improve the efficiency by using cylindrical modal basis functions, whose global property reduces the size of the system matrix. In addition, the orthogonal property of the cylindrical conduction mode basis functions enables automatic capture of current and charge crowding caused by skin and proximity effects. The application of such cylindrical conduction and accumulation mode basis functions to the mixed potential integral equation and details for computing partial resistances, inductances, capacitances and conductances have been discussed. Furthermore, two enhancement schemes were disclosed that accelerate computation of mutual inductances, so that the speed to fill the system matrices is improved to $O(N^{1.8})$. Finally, the disclosed modeling tool demonstrates good accuracy and capability for solving large three-dimensional interconnection structures. Therefore, the disclosed method provides a solution to the industrial need for wide-band electrical modeling of practical high-density interconnections arising in system-in-package or three-dimensional integration.

Thus, electrical modeling apparatus, methods and software have been disclosed that use cylindrical modal basis functions to model inductance, resistance, capacitance, and conductance in system-in-package (SiP) modules, and the like. It is to be understood that the above-described embodiments are merely illustrative of some of the many specific embodiments that represent applications of the principles discussed above. Clearly, numerous and other arrangements can be readily devised by those skilled in the art without departing from the scope of the invention.

What is claimed is:

1. Electrical modeling apparatus for electrically modeling three-dimensional circuit structures having cylindrical conductors, comprising:
    a computer; and
    software that runs on the computer that comprises:
    a first code segment that defines a plurality of cylindrical conduction mode basis functions constructed on cylindrical coordinates;
    a second code segment that defines a plurality of cylindrical accumulation mode basis functions constructed on cylindrical coordinates;
    a third code segment that linearly combines selected cylindrical conduction mode basis functions to approximate a current density distribution over a cross section of a cylindrical conductor;
    a fourth code segment that linearly combines selected cylindrical accumulation mode basis functions to approximate a charge density distribution over the cross section of the cylindrical conductor; and
    a fifth code segment that constructs equivalent circuit equations from the selected cylindrical conduction and accumulation mode basis functions.

2. The apparatus recited in claim 1 wherein the cylindrical conduction mode basis functions define skin and proximity effects of currents in the cylindrical conductors.

3. The apparatus recited in claim 1 wherein the cylindrical accumulation mode basis functions define skin and proximity effects of charges on the cylindrical conductors.

4. The apparatus recited in claim 1 wherein a zero order basis function describes skin effects of the cylindrical conductors.

5. The apparatus recited in claim 4 wherein a higher order basis function describes proximity effects of the cylindrical conductors.

6. The apparatus recited in claim 1 wherein the software further comprises:
    a code segment that defines error bounds and thresholds between the cylindrical conductors;
    a code segment that defines an initial distance between each of the cylindrical conductors;
    a code segment that compares the distance between the cylindrical conductors to the defined threshold distance;
    a code segment that, if the distance between the cylindrical conductors is larger than the defined threshold distance, computes the thin-filament approximate integral for frequency-independent mutual inductance; and
    a code segment that, if the distance is not large enough for the approximation, computes sampled values of the frequency-independent integral;
    wherein the first and third code segments perform a frequency sweep simulation by computing impedances from skin-effect-modes ($Z_{ss}$), determines required proximity-effect-mode basis functions using initial coupling coefficients found from $Z_{ss}$, determines skin-effect and proximity-effect impedances ($Z_{pp}$ and $Z_{sp}$) from the proximity-effect-mode basis functions, and computes conductor and wire impedances; and
    wherein the second and fourth code segments perform a simulation by computing admittances from skin-effect-modes ($P_{ss}$), determines required proximity-effect-mode basis functions using initial coupling coefficients found from $P_{ss}$, determines skin-effect and proximity-effect conductances and capacitances ($P_{pp}$ and $P_{sp}$) from the proximity-effect-mode basis functions, and computes conductor and wire conductances and capacitances.

7. A method, operable on a digital computer, for electrically modeling three-dimensional circuit structures having cylindrical conductors, comprising:
    instructing the digital computer to define a plurality of cylindrical conduction mode basis functions constructed on cylindrical coordinates;
    instructing the digital computer to define a plurality of cylindrical accumulation mode basis functions constructed on cylindrical coordinates;
    instructing the digital computer to linearly combine selected cylindrical conduction mode basis functions to approximate a current density distribution over a cross section of a cylindrical conductor;

instructing the digital computer to linearly combine selected cylindrical accumulation mode basis functions to approximate a charge density distribution over the cross section of the cylindrical conductor; and instructing the digital computer to construct an equivalent resistance, inductance, conductance, capacitance (RLGC) circuit from the selected cylindrical conduction and accumulation mode basis functions.

8. The method recited in claim 7 wherein cylindrical conduction mode basis functions define skin and proximity effects of currents in the cylindrical conductors.

9. The method recited in claim 7 wherein cylindrical accumulation mode basis functions define skin and proximity effects of charges on the cylindrical conductors.

10. The method recited in claim 7 wherein a zero order basis function describes skin effects of the cylindrical conductors.

11. The method recited in claim 7 wherein a higher order basis function describes proximity effects of the cylindrical conductors.

12. The method recited in claim 7 further comprising:

instructing the digital computer to define error bounds and thresholds between the cylindrical conductors;

instructing the digital computer to define an initial distance between each of the cylindrical conductors;

instructing the digital computer to compare the distance between the cylindrical conductors to the defined threshold distance;

if the distance between the cylindrical conductors is larger than the defined threshold distance, instructing the digital computer to compute the thin-filament approximate integral for frequency-independent mutual inductance; and if the distance is not large enough for the approximation, instructing the digital computer to compute sampled values of the frequency-independent integral;

wherein the cylindrical conduction mode basis functions are defined and combined by performing a frequency sweep simulation and computing impedances from skin-effect-modes ($Z_{ss}$), determining required proximity-effect-mode basis functions using initial coupling coefficients found from $Z_{ss}$, determining skin-effect and proximity-effect impedances ($Z_{pp}$ and $Z_{sp}$) from the proximity-effect-mode basis functions, and computing conductor and wire impedances; and wherein the cylindrical accumulation mode basis functions are defined and combined by performing a simulation and computing admittances from skin-effect-modes ($P_{ss}$), determining required proximity-effect-mode basis functions using initial coupling coefficients found from $P_{ss}$, determining skin-effect and proximity-effect conductances and capacitances ($P_{pp}$ and $P_{sp}$) from the proximity-effect-mode basis functions, and computing conductor and wire conductances and capacitances.

13. A computer readable memory storing a plurality of computer-executable instructions for electrically modeling three-dimensional circuit structures having cylindrical conductors, the plurality of instructions comprising:

a first code segment that defines a plurality of cylindrical conduction mode basis functions constructed on cylindrical coordinates;

a second code segment that defines a plurality of cylindrical accumulation mode basis functions constructed on cylindrical coordinates;

a third code segment that linearly combines selected cylindrical conduction mode basis functions to approximate a current density distribution over a cross section of a cylindrical conductor;

a fourth code segment that linearly combines selected cylindrical accumulation mode basis functions to approximate a charge density distribution over the cross section of the cylindrical conductor; and a fifth code segment that constructs equivalent circuit equations from the selected cylindrical conduction and accumulation mode basis functions.

14. The computer readable memory recited in claim 13 wherein cylindrical conduction mode basis functions define skin and proximity effects of currents in the cylindrical conductors.

15. The computer readable memory recited in claim 13 wherein cylindrical accumulation mode basis functions define skin and proximity effects of charges on the cylindrical conductors.

16. The computer readable memory recited in claim 13 wherein a zero order basis function describes skin effects of the cylindrical conductors.

17. The computer readable memory recited in claim 13 wherein a higher order basis function describes proximity effects of the cylindrical conductors.

18. The computer readable memory recited in claim 13 wherein the computer-executable instructions further include:

a code segment that defines error bounds and thresholds between the cylindrical conductors;

a code segment that defines an initial distance between each of the cylindrical conductors;

a code segment that compares the distance between the cylindrical conductors to the defined threshold distance;

a code segment that, if the distance between the cylindrical conductors is larger than the defined threshold distance, computes the thin-filament approximate integral for frequency-independent mutual inductance; and a code segment that, if the distance is not large enough for the approximation, computes sampled values of the frequency-independent integral;

wherein the first and third code segments perform a frequency sweep simulation by computing impedances from skin-effect-modes ($Z_{ss}$), determines required proximity-effect-mode basis functions using initial coupling coefficients found from $Z_{ss}$, determines skin-effect and proximity-effect impedances ($Z_{pp}$ and $Z_{sp}$) from the proximity-effect-mode basis functions, and computes conductor and wire impedances; and wherein the second and fourth code segments perform a simulation by computing admittances from skin-effect-modes ($P_{ss}$), determines required proximity-effect-mode basis functions using initial coupling coefficients found from $P_{ss}$, determines skin-effect and proximity-effect conductances and capacitances ($P_{pp}$ and $P_{sp}$)) from the proximity-effect-mode basis functions, and computes conductor and wire conductances and capacitances.

* * * * *